United States Patent [19]

Duluk, Jr.

[11] Patent Number: 5,572,634
[45] Date of Patent: Nov. 5, 1996

[54] METHOD AND APPARATUS FOR SPATIAL SIMULATION ACCELERATION

[75] Inventor: Jerome F. Duluk, Jr., Palo Alto, Calif.

[73] Assignee: Silicon Engines, Inc., Palo Alto, Calif.

[21] Appl. No.: 329,226

[22] Filed: Oct. 26, 1994

[51] Int. Cl.$^6$ .................................................. G06T 15/00
[52] U.S. Cl. ............................................................. 395/119
[58] Field of Search ............................................ 395/119, 120, 395/121

[56] References Cited

U.S. PATENT DOCUMENTS

| | | | |
|---|---|---|---|
| 4,890,242 | 12/1989 | Sinha et al. | 395/119 |
| 4,996,666 | 2/1991 | Duluk, Jr. | 365/49 |
| 5,363,475 | 11/1994 | Baker et al. | 395/122 |

OTHER PUBLICATIONS

Foley et al.; *Computer Graphics: Principles and Practice*, second edition; 1990; pp. 336–337, 660–663, 887–888.

Hubard, P. M., "Interactive Collision Detection", included in the course notes Developing Advanced Virtual Reality Applications, Course 2, ACM SIGGRAPH 94, Jul. 24–29, 1994.

Naylor, B. "Binary Space Partitioning Trees, A Tutorial", included in the course notes Computational Representations of Geometry, Course 23, ACM SIGGRAPH 94, Jul. 24–29, 1994.

*Primary Examiner*—Heather R. Herndon
*Assistant Examiner*—Rudolph Buchel
*Attorney, Agent, or Firm*—Flehr, Hohbach, Test, Albritton & Herbert

[57] ABSTRACT

Apparatus and method for detecting unconstrained collisions between three-dimensional moving objects are described. The apparatus and method addresses the problems associated with handling objects with substance passing through each other in three-dimensional space. When objects collide in a three-dimensional simulation, it is important to identify such collisions in real-time so that the behavior of the colliding objects may be adjusted appropriately. Native vertices are stored and novel structure is provided so that the stored words containing native vertices work together to form polygons, or other object primitives, that work together. For triangle object primitives, three vertices form the first triangle primitive, but a second triangle primitive is formed by receiving and storing only one additional vertex, the other two vertices needed to form the second triangle primitive being shared with the first triangle primitive. The apparatus and method also provides structure for storing and communicating polygon vertex relationship information between multiple object primitives and objects, and structure and method for comparing the extent of an object primitive with all other previously stored object primitive extents simultaneous with receipt and storage of the object primitive vertex data. The ability to store each coordinate vertex only once and to share the vertex coordinate information among multiple objects radically reduces the vertex storage requirements, simplifies unconstrained object collision determinations, and increases data throughput so that real-time, or near real-time, computations appropriate for simulation are achieved.

29 Claims, 23 Drawing Sheets

| 1800 Priority Resolver | | | | | | | | | | | | | 1700 one Priority Resolve Bit / 1100 one GCAM Word |
|---|---|---|---|---|---|---|---|---|---|---|---|---|---|
| t(W) | x(W) | CMD | y(W) | CMD | z(W) | CMD | WSF | PMD | WC | | | | |
| t(W-1) | x(W-1) | CMD | y(W-1) | CMD | z(W-1) | CMD | WSF | PMD | WC | | | | |
| t(W-2) | x(W-2) | CMD | y(W-2) | CMD | z(W-2) | CMD | WSF | PMD | WC | | | | |
| ... | ... | ... | ... | ... | ... | ... | ... | ... | ... | | | | |
| t(N+1) | x(N+1) | CMD | y(N+1) | CMD | z(N+1) | CMD | WSF | PMD | WC | | | | |
| t(N) | x(N) | CMD | y(N) | CMD | z(N) | CMD | WSF | PMD | WC | | | | |
| t(N-1) | x(N-1) | CMD | y(N-1) | CMD | z(N-1) | CMD | WSF | PMD | WC | | | | |
| ... | ... | ... | ... | ... | ... | ... | ... | ... | ... | | | | |
| t(n+1) | x(n+1) | CMD | y(n+1) | CMD | z(n+1) | CMD | WSF | PMD | WC | | | | |
| t(n) | x(n) | CMD | y(n) | CMD | z(n) | CMD | WSF | PMD | WC | | | | |
| t(n-1) | x(n-1) | CMD | y(n-1) | CMD | z(n-1) | CMD | WSF | PMD | WC | | | | |
| ... | ... | ... | ... | ... | ... | ... | ... | ... | ... | | | | |
| t(3) | x(3) | CMD | y(3) | CMD | z(3) | CMD | WSF | PMD | WC | | | | |
| t(2) | x(2) | CMD | y(2) | CMD | z(2) | CMD | WSF | PMD | WC | | | | |
| t(1) | x(1) | CMD | y(1) | CMD | z(1) | CMD | WSF | PMD | WC | | | | |
| t(0) | x(0) | CMD | y(0) | CMD | z(0) | CMD | WSF | PMD | WC | | | | |

FIG. 10

METHOD AND APPARATUS FOR SPATIAL SIMULATION ACCELERATION

CROSS REFERENCE TO RELATED APPLICATION

The subject matter of this application is related to U.S. application Ser. No. 08/231,251, filed Apr. 21, 1994, entitled "Method and Apparatus for Parallel Query Z-buffer", assigned to the assignee of this invention, and incorporated herein by reference.

FIELD OF THE INVENTION

The field of this invention is twofold: 1) querying of spatial databases, and more specifically, querying databases of three-dimensional data for simulation of moving objects; and 2) computer memories, and more specifically, Content Addressable Memories (CAM).

BACKGROUND OF THE INVENTION

Spatial Simulations

Spatial simulation is a computer application that attempts to discover or experience the properties of a three-dimensional (3D) environment entirely within the computer. Simulated environments can be tested and improved before the actual environment is constructed. A few examples of this type of simulation are: walking through a building before it is constructed to determine if it is ergonomically correct; testing a factory assembly line for throughput and connect location of equipment and materials; construction of a airplane to see if all the parts fit together and testing for adequate room for each passenger; and testing a submarine design to determine if the crew can perform their necessary duties in the cramp space. This type of application of spatial simulation may require real time interaction with objects in the simulated environment and/or real time generation of the visual presentation.

Another need for spatial simulations is situated learning. Situated learning puts a pupil or trainee into a working environment in order to learn by experience. Simulation is important in situated learning because: 1) unusual or dangerous situations can be experienced easily and safely; 2) the actual environment may not exist or is not available for training; and 3) new teacher-trainee interaction can include things which maybe impossible in the actual environment (e.g., the teacher and pupil located in the same small physical space). This type of application of spatial simulation generally requires real time interaction with objects in the simulated environment and real time picture generation. A real time simulation of this type is sometimes called Virtual Reality (VR).

Simulation is also important in interactive entertainment. Interactive entertainment could include flying a simulated airplane or fighting a 3D dragon. This type of application generally requires real time interaction with objects and real time picture generation.

One major difficulty with spatial simulations is managing the vast amount of spatial data and determining object interactions. Determining object interactions is commonly called "collision detection". A simulation may include thousands of objects, many of which are moving. During the simulation, these objects can collide with other objects, causing objects to change trajectory, break into smaller objects, or merge to form larger objects. As an object's position changes during the simulation, its volume and/or surface must be compared to the volume and/or surface of the other objects. The set of objects form a spatial database and spatial queries are done using a moving object's volume and/or surface as the query region for the spatial query. In essence, a spatial query asks: does anything stored in the database occupy any part of the query region.

Spatial simulations are generally done in discrete time steps, where the state of the simulated environment is determined for particular instants in simulated time. During a simulation step, the time index is incremented by the time step, and a new state of the simulated environment is determined. In some simulations, the size of the time step can vary, depending on the rate of change of the state in the simulated environment. For example, time steps can be made smaller if objects in the simulation are moving faster.

Three-dimensional Computer Graphics

Spatial simulations usually include a visual presentation, generally done in real time, done with 3D computer graphics. Computer graphics is the art and science of generating pictures with a computer. Generation of pictures is commonly called rendering. Generally, in 3D computer graphics, geometry that represents surfaces (or volumes) of objects in a scene is translated into pixels stored in a frame buffer, and then displayed on a display device, such as a CRT.

A summary of the rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference).

An example of a hardware renderer is incorporated herein by reference: "Leo: A System for Cost Effective 3D Shaded Graphics", by Deering and Nelson, pages 101 to 108 of SIGGRAPH 93 Proceedings, 1–6 Aug. 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Deering Reference).

In computer graphics, each renderable object generally has its own local object coordinate system, and therefore needs to be translated from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. These translation steps can be compressed into one or two steps by precomputing appropriate translation matrices before any translation occurs.

The input to the graphics pipeline is renderable geometry, generally in object coordinates. The renderable geometry is usually described by planar polygons, read from a graphics geometry database. For spatial simulations, it may be advantageous for the spatial data used for object interaction to be the same as the data used for rendering. This eliminates the need to generate two models (i.e., one for rendering and one for spatial interaction) for each object, and also eliminates the need to maintain two different databases as the spatial simulation proceeds.

FIG. 1 shows a three-dimensional object, a tetrahedron, with its own coordinate axes ($x_{obj}$, $y_{obj}$, $z_{obj}$), hereinafter called object coordinates. The three-dimensional object 102 is translated, scaled, and placed in the viewing point's 104 coordinate system based on ($x_{eye}$, $y_{eye}$, $z_{eye}$), called eye coordinates. The object 106 is projected onto the viewing plane 108, thereby correcting for perspective. At this point, the object appears to have become two-dimensional; however, the object's z-coordinates are preserved so they can be used later for hidden surface removal techniques. The object is finally translated to screen coordinates of the display screen 110, based on ($x_{screen}$, $y_{screen}$, $z_{screen}$), where $z_{screen}$ is going perpendicularly into the page. Points on the object's surface now have their x and y coordinates described by pixel location within the display screen 110 and their z coordinates in a scaled version of distance from the viewing point. In a spatial simulation, object interaction computations are generally done in world coordinates, which has a fixed origin, and both simulated objects and the viewing point move relative to this origin.

Existing hardware renders take geometry in object coordinates and generate a set of pixel color values. The graphics pipeline smashes each polygon into individual pixels and does not keep any intermediate data. Because of this, computations for spatial interactions are not done within existing graphics pipelines. Since graphics pipelines do not keep any spatial data in world coordinates, rendered objects can pass through each other unless an additional spatial interaction process prevents it.

3D Graphics Geometry Databases

The geometry needed to generate a renderable scene is stored in a database (also called a data structure). This geometry database can be a simple display list of graphics primitives or a hierarchically organized data structure. In the hierarchically organized geometry database, the root of the hierarchy is the entire database, and the first layer of nodes in the data structure is generally all the objects in the "world" which can be seen from the viewpoint. Each object, in turn, contains subobjects, which, in turn, contain sub-subobjects; thus resulting in a hierarchical "tree" of objects. At the lowest level of the tree (here, trees grow downward) are the renderable primitives.

Hereinafter, the term "object" shall refer to any node in the hierarchial tree which is neither a renderable primitive nor the root of the entire scene. The term "root object" shall refer to a node in the first layer of nodes below the root in the data structure ("children" of the scene root node). The term "leaf object" will be used here to mean an node which has any child nodes that are renderable primitives. As illustrated in FIG. 2, the hierarchical database for a scene starts with the scene root node, then the first layer of nodes are the root objects, lower nodes are additional hierarchical objects, and any object that has a renderable primitive (in the figure, a polygon) as a child is a leaf object. Leaf objects can also have children that are other objects. An example of a leaf object that also has child objects is the upper arm portion of a robot arm. The upper arm has its own surface (and therefore has polygons as children), but also has the lower arm as a child (the lower arm is itself an object). Also, a root object can also be a leaf object.

Hierarchical databases are used by the Programmer's Hierarchical Interactive System (PHIGS) and PHIGS PLUS standards. An explanation of these standards can be found in the book, "A Practical Introduction to PHIGS and PHIGS PLUS", by T. L. J. Howard, et. al., published by Addison-Wesley Publishing Company, 1991, ISBN 0-201-41641-7 (incorporated herein by reference and hereinafter called the Howard Reference). The Howard Reference describes the hierarchical nature of 3D models and their data structure on pages 5 through 8.

Another type a data structure is the Binary Space Partitioning (BSP) Tree. BSP Trees presort the geometry by recursively subdividing space into two regions. A short tutorial on the subject can be found in: "Binary Space Partitioning Trees, A Tutorial", by Bruce Naylor, included in the course notes "Computational Representations of Geometry", Course 23, ACM SIGGRAPH 94, Jul. 24–29, 1994. In general, BSP Trees are best suited to rendering acceleration of static databases (no moving objects).

Spatial Databases and Spatial Querying

Spatial databases have many applications, and a serious exploration of these applications is found in "Applications of Spatial Data Structures", by H. Samet, published by Addison-Wesley Publishing Company, 1990, ISBN 0-201-50300-X.

Theoretical basis of spatial databases can be found in: 1) "Multi-dimensional Searching and Computational Geometry", by K. Melhorn, published by Springer-Verlag, 1984, ISBN 0-387-13642-8, hereinafter called the Melhorn Reference; 2) "Geographic Database Management Systems", Workshop Proceedings Capri, Italy, May 1991, edited by G. Gambosi, et. al., published by Springer-Verlag, 1992, ISBN 0-387-5561-6, hereinafter called the Gambosi Reference; and 3) "The Design and Analysis of Spatial Data Structures", by H. Samet, published by Addison-Wesley Publishing Company, 1989, ISBN 0-201-50255-0, hereinafter called the Samet Reference.

The most desirable features of a spatial data structure design are: short query time; short data structure update time; and small data structure size. For real time spatial simulations, the first two of these three features are most important. Short query time allows a large number of queries during a simulation step, thereby allowing a larger number of moving 3D objects to be simulated. Data structure update time is also very important because, as an object moves, its location in the spatial data structure is updated. Many data structures (BSP Trees and other presort techniques) provide very high query rates, but have very low data structure update rates. For highest simulation throughput, both fast queries and fast updates are required.

For spatial simulations, example needs for spatial querying are: 1) to determine if moving objects collide; 2) to allow autonomous entities ("virtual creatures") to sense their environment in order to determine behavior; 3) to determine which objects are within the field of view of a human participant as an aid to 3D graphics rendering; and 4) to find constraining surfaces along which an object moves (e.g., tires along a road surface). All of these needs are similar in that they look for objects or surfaces within a specific bounded location within the simulation. For some of the above listed needs, an "object" maybe a region of space (e.g., a viewing frustum or the possible locations of a tire), rather than the representation of an actual 3D object. Hence, the general problem can be thought of as a collision detection problem, and this term will be used throughout the balance of this document.

Ideally, the collision detection problem is solved without requiring the designer of the spatial simulation to make any a priori assumptions about how objects may collide. That is, any object can collide/interact with any other object, and no pairs of objects are assumed to never collide (unless both are stationary). Assuming N objects (all moving) in a simulation, simple algorithms are order $N^2$. For a simulation with 10,000 objects and 72 simulation steps per second, the number of object-to-object comparisons is $7.2 \times 10^{11}$ per second. The simplest object-to-object comparison utilizes a simple bounding volume around each object. Thus, the bounding volumes of objects can first be compared to each other. If the bounding volumes do not intersect, then no further comparisons are required. However, if the bounding volumes intersect, then the actual shape (or a good approximation) of each object must be utilized.

The computational load of object-to-object comparisons whose bounding volumes intersect is dependent on the actual shape of each object. That is, each object is actually a complex surface or volume. The shape of objects can be described by: planar polygons that approximate the surface of an object; Constructive Solid Geometry (CGS) which describes the surface and volume of an object as unions and intersections of simpler geometric primitives; and polyhedra, such as tetrahedrons, which approximate the surface with the faces of the polyhedra and approximate the volume with the volumes of the polyhedra.

Assuming the 3D graphics database of polygons is used for the surface of each object, object surfaces are described by hundreds or thousands of polygons. Thus, when the bounding volumes of two objects intersect, the detailed object-to-object comparison is accomplished by a set of polygon-to-polygon comparisons. Once again, to simplify computations, bounding volumes can be used for each polygon. When the bounding volumes of two polygons intersect, then computational geometry is used to determine if the polygons actually intersect. For CGS and polyhedra representations, a similar approach is used.

Assuming N moving objects, each with M polygons, and a probability p that any two object's bounding volumes intersect, then the total number of bounding volume comparisons needed is $N^2+pM^2$ per simulation step. Sophisticated algorithms, such as those in the Melhorn Reference, Gambosi Reference, and the Samet Reference, significantly reduce the number of operations, but generally increase data structure update time. Despite these more sophisticated algorithms, higher performance is needed for sophisticated spatial simulations. This document describes a new method and apparatus for substantially accelerating spatial queries.

Content Addressable Memories

Most Content Addressable Memories (CAM) perform a bit-for-bit equality test between an input vector and each of the data words stored in the CAM. This type of CAM frequently provides masking of bit positions in order to eliminate the corresponding bit in all words from affecting the equality test. It is inefficient to perform magnitude comparisons in a equality-testing CAM because a large number of clock cycles is required to do the task.

CAMs are presently used in translation look-aside buffers within a virtual memory systems in some computers. CAMs are also used to match addresses in high speed computer networks. CAMs are not used in any practical prior art renders.

Magnitude Comparison CAM (MCCAM) is defined here as any CAM where the stored data are treated as numbers, and arithmetic magnitude comparisons (i.e. less-than, greater-than, less-than-or-equal-to, etc.) are performed in parallel. This is in contrast to ordinary CAM which treats stored data strictly as bit vectors, not as numbers. An MCCAM patent, by incorporated herein by reference, is U.S. Pat. No. 4,996,666, by Jerome F. Duluk Jr., entitled "Content-Addressable Memory System Capable of Fully Parallel Magnitude Comparisons", granted Feb. 26, 1991 (hereinafter referred to as the Duluk Patent). Structures within the Duluk Patent specifically referenced shall include the prefix "Duluk Patent", e.g. "Duluk Patent MCCAM Bit Circuit". MCCAMs are not used in any prior art spatial database search apparatuses.

The basic structure of an MCCAM is a set of memory bits organized into words, where each word is composed of one or more fields, where each field stores a number and can perform an arithmetic magnitude comparison between the stored value and input data. In general, one word of prior art MCCAM is used to store the location of one point in a sparsely populated space of points.

SUMMARY OF THE INVENTION

FIG. 3 is the Collision Detection Method 300 for solving the collision detection problem for one simulation step within a spatial simulation. In the Object Processing Step 500, object's bounding boxes are compared to each other to determine which objects may intersect. This step 500 generates a list of sets of possibly intersecting objects. Then 404, 406, each set of possibly intersecting objects is processed. In the Geometry Processing Step 900, the geometry representing the surfaces or volumes of objects within a set is processed. This step 900 finds pairs of geometry primitives (in different objects) that have intersecting bounding boxes. Potentially, such primitive pairs may intersect. Then 408, 410, each primitive pair is processed. In the Analytic Geometry Step 412, the specific geometric data of the geometry primitives are used to determine if the primitives actually intersect. If 414 the primitives actually intersect, then a collision has been found 416.

This document describes a method and apparatus for accelerating the Object Processing Step 500 and the Geometry Processing Step 900. This is done with a new type of MCCAM, called a Geometry CAM 1000 (hereinafter abbreviated GCAM 1000). The GCAM 1000 is a multiplicity of GCAM Words 1100, each GCAM Word 1100 including a multiplicity of Coordinate Fields 1200 that perform arithmetic comparisons. The words within the MCCAM of the Duluk Patent also have multiple fields that perform arithmetic comparisons. However, the GCAM 1000 additionally includes mechanisms for groups of GCAM Words 1100 to function together in storing a geometry primitive. Also, the GCAM 1000 includes a mechanism allowing geometry primitives to share vertices. Sharing vertices is important because a commonly used type of spatial primitive, the polygon mesh, shares vertices between polygons. The GCAM 1000 is used to find collisions between geometry primitives (or objects) by detecting intersections between bounding boxes around the geometry primitives (or objects).

The Object Processing Step 500 and the Geometry Processing Step 900 are both accelerated from an $O(N^2)$ method to an $O(N)$ method by use of the parallel comparison apparatus included in the GCAM 1000. Both the Object Processing Step 500 and the Geometry Processing Step 900 can be used on hierarchically organized data for additional performance gains.

The GCAM 1000 is well suited to implementation as a set of VLSI circuits. Included herein are CMOS transistor circuits used in the Coordinate Fields 1200.

A BRIEF DESCRIPTION OF THE DRAWINGS

FIG. 1: An object in three-dimensional space, its projection onto the viewing plane, and its image on a display screen.

FIG. 2: Hierarchical data structure for 3D geometry.

FIG. 3: Method flow diagram for the Collision Detection Method 300 which finds collisions within a spatial database of objects.

FIG. 4: Bounding Boxes around two 3D objects (only two dimensions illustrated).

FIG. 5: Method flow diagram for the Object Processing Step 500, which finds the intersections of the bounding volumes of a set of objects, and includes the GCAM Object Intersection Test 501.

FIG. 6: Bounding Boxes around polygons.

FIG. 7: Bounding Boxes around polygons within a polygon mesh.

FIG. 8: Comparison Result Bits usage.

FIG. 9: Method flow diagram for the Geometry Processing Step 900, which finds the intersections of the bounding boxes of 3D triangles, and includes the GCAM Triangle Intersection Test 901.

FIG. 10: GCAM 1000 data organization, including a multiplicity of GCAM Words 1100.

FIG. 11: Block diagram of the GCAM Word 1100.

FIG. 12: Block Diagram of a Coordinate Field 1200 within a GCAM Word 1100.

FIG. 13: Schematic Diagram of a Coordinate Hit Detect 1300 within a GCAM Word 1100.

FIG. 14: Schematic Diagram of a Polygon Miss Detect 1400 within a GCAM Word 1100.

FIG. 15: Schematic Diagram of the Word Status Flags 1500 within a GCAM Word 1100.

FIG. 16: Schematic Diagram of the Word Control 1600 within a GCAM Word 1100.

FIG. 17: Schematic Diagram of the Priority Resolve Bit 1700 within a GCAM Word 1100.

FIG. 18: Schematic Diagram of the Priority Resolver 1800 within a GCAM 1000 composed of sixteen GCAM Words 1100.

FIG. 19: Schematic Diagram of a Priority Resolve Section 1900 within the Priority Resolver 1800.

FIG. 20: Schematic Diagram of a PriRes4 2000 circuit used in the Priority Resolver 1800.

FIG. 21: CMOS transistor circuit for a Precharged Fourteen Transistor GCAM Bit Cell 2100 which can be used in a Coordinate Field 1200.

FIG. 22: CMOS transistor circuit for a Non-precharged Fifteen Transistor GCAM Bit Cell 2200 which can be used in a Coordinate Field 1200.

FIG. 23: CMOS transistor circuit for a Coordinate Field 1200.

DETAILED DESCRIPTION OF THE INVENTION

Collision Detection Method 300

This invention uses a new type of MCCAM, called the GCAM 1000, to store and query a list of multi-dimensional objects. In a spatial simulation, the objects are three-dimensional (3D). Objects are represented by spatial primitives, and spatial queries performed by the GCAM 1000 operate on spatial primitives stored in the GCAM 1000. Spatial primitives include: 1) Bounding Box; 2) Parallelepiped Bounding Volume; 3) Objects, as a constellation of vertices; 4) polygons; 5) polyhedra; 6) polygon meshes; 7) polyhedron meshes; and 8) CSG primitives. The GCAM 1000 uses one or more words to store the location of spatial primitives in world coordinates.

Figure 1:
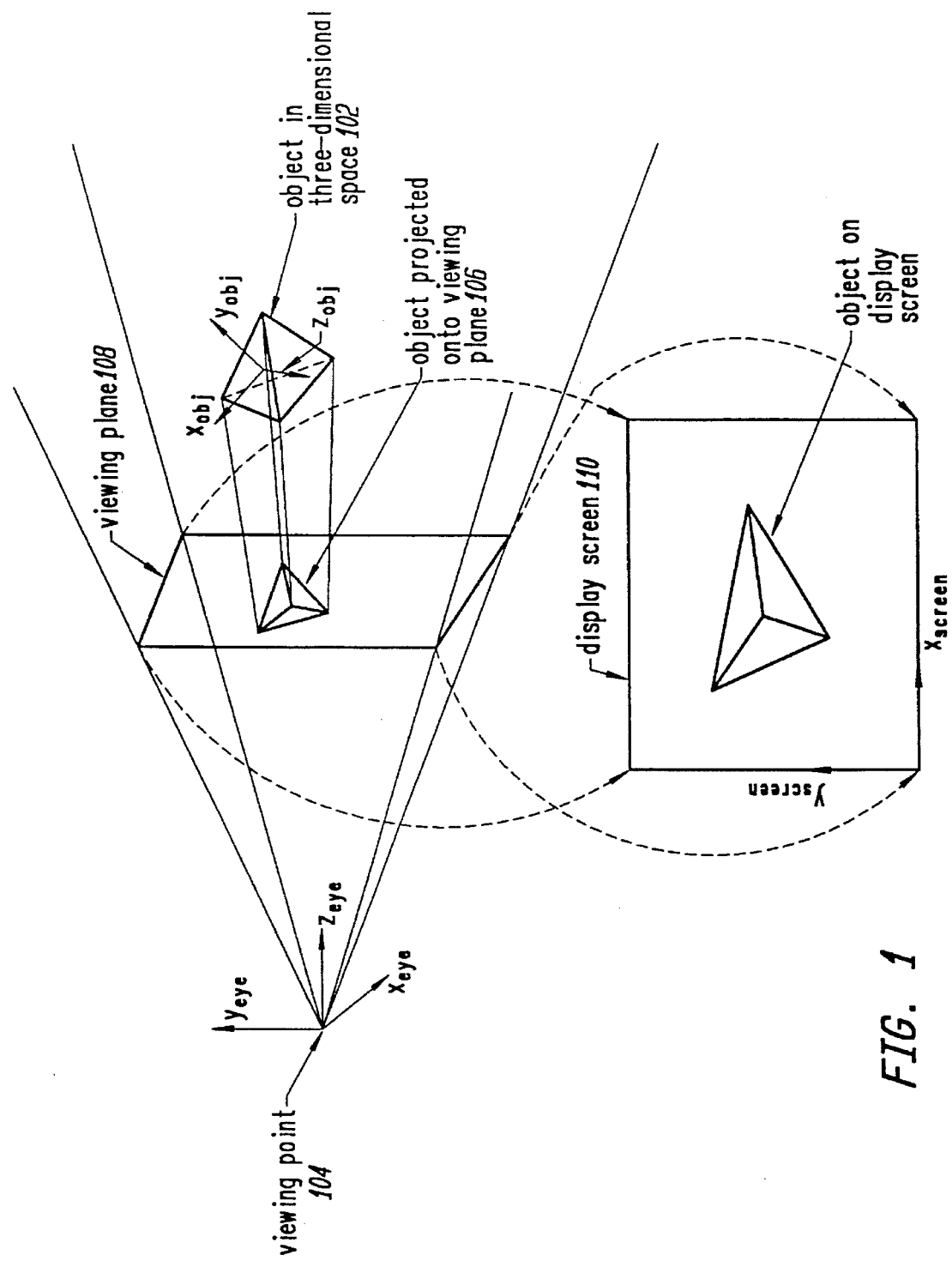
Figure 2:
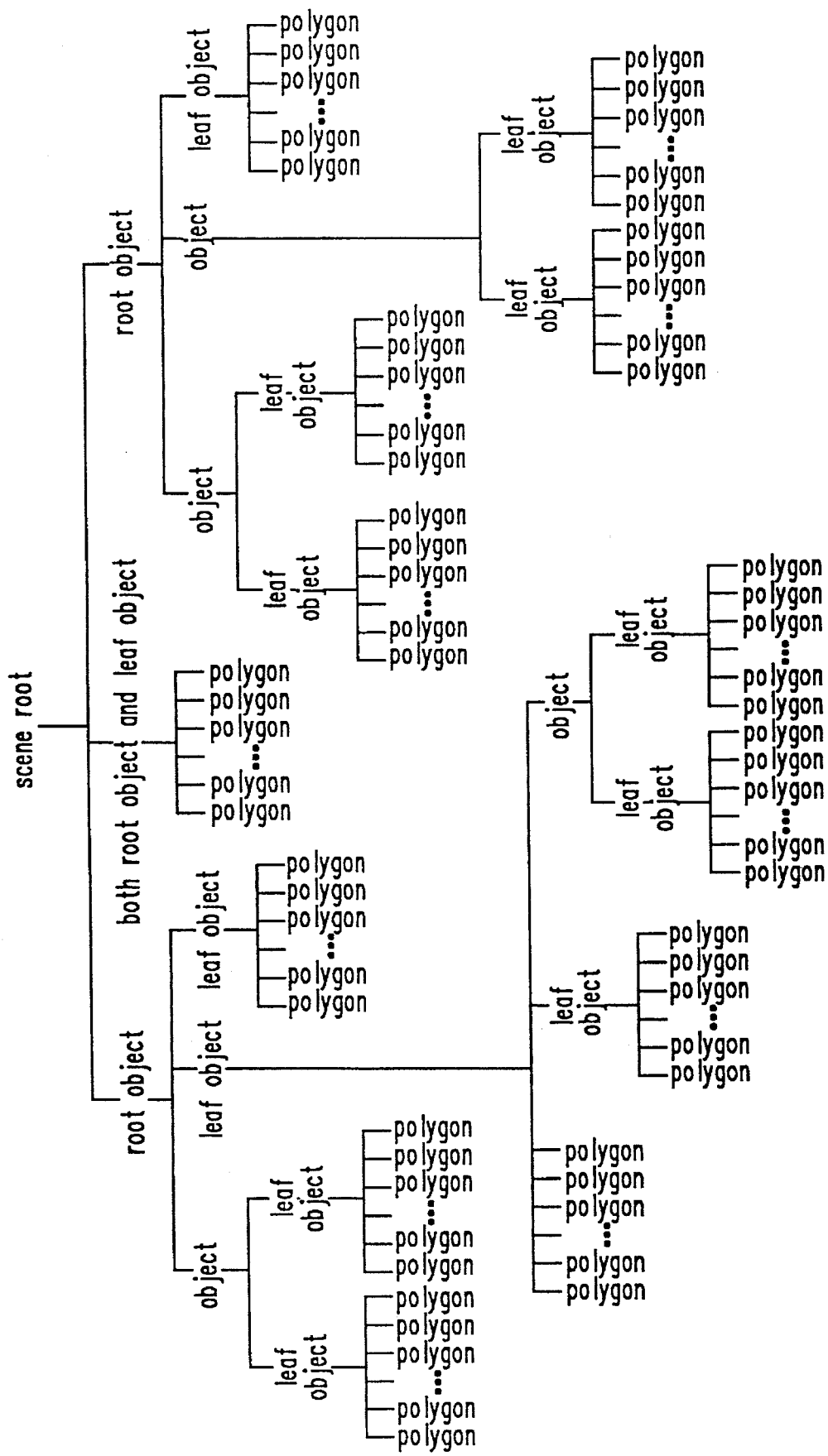
Figure 3:
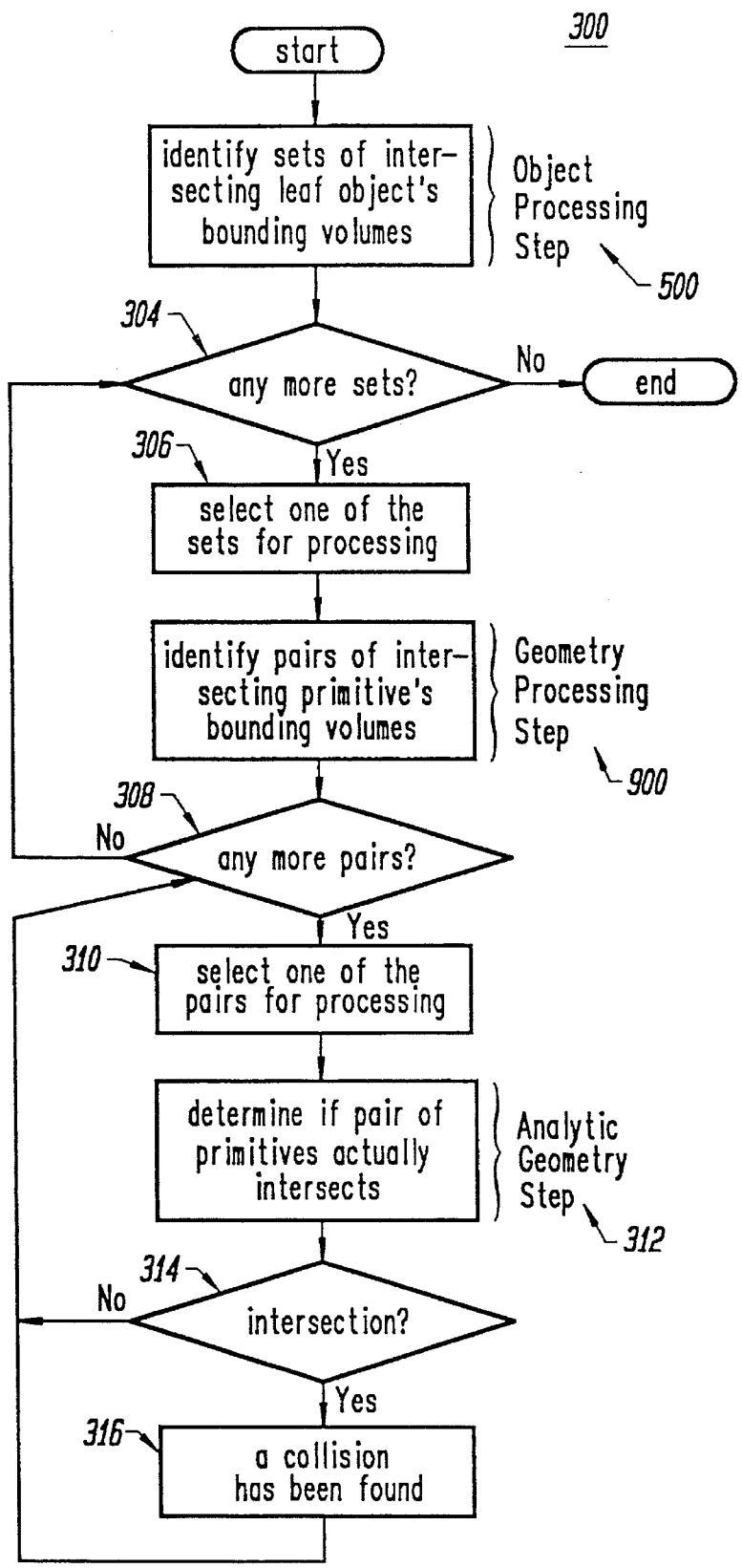

FIG. 3 is the Collision Detection Method 300, and incorporates three major steps: 1) the Object Processing Step 500; 2) the Geometry Processing Step 900; and 3) the Analytic Geometry Step 312.

The Object Processing Step 500 makes bounding volumes around each object, and tests these bounding volumes for intersection. If the bounding volumes for two objects intersect, then the actual geometry of the objects may intersect. As a new bounding volume is processed, its position in space is compared to the position of all the other bounding volumes. These comparisons are done in parallel by the GCAM 1000, and bounding boxes (defined later) are used as an approximation for the bounding volumes. The output of the Object Processing Step 500 is a list of sets of leaf objects whose bounding boxes intersect.

Since objects are generally hierarchically organized, bounding volume intersection can also be done hierarchically. That is, if bounding volumes of two objects intersect, then bounding volumes of subobjects within these two objects can be compared for intersection. This process can proceed recursively down the data structure tree until leaf objects are reached. Alternatively, a method could use only bounding volumes around the geometry within leaf objects, thereby avoiding the complexity of the recursive approach. For simplicity sake, hereinafter, the description of the Object Processing Step 500 assumes this non-recursive approach.

The Geometry Processing Step 900 takes the list of sets of objects output by the Object Processing Step 500 and processes the geometry primitives within the leaf objects. Bounding volumes around geometry primitives are generated, and then compared to each other to determine intersection. Just as in the Object Processing Step 500, the comparisons are done in parallel by the GCAM 1000 which uses bounding boxes (defined later) as an approximation for the bounding volumes. The output of the Geometry Processing Step 900 is pairs of geometry primitives whose bounding boxes intersect.

Geometry databases sometimes include multiple versions of an object, each with a different degree of precision. For example, the model of a car may include three versions: a coarse model with 100 polygons in one layer of hierarchy; a fine model with 2000 polygons in two layers of hierarchy; and a very detailed model with 50,000 polygons in five layers of hierarchy. In general, for 3D graphics, as the viewing point moves closer to an object, a finer model must be used. These multiple resolution models can also be used in the collision detection problem. Thus, if bounding volumes around geometry intersect, then finer models can be recursively used. For simplicity sake, hereinafter, the description of the Geometry Processing Step 900 assumes the non-recursive approach.

The Analytic Geometry Step 312 takes the pairs of geometry primitives output by the Geometry Processing Step 900 and determines if they actually intersect. The Analytic Geometry Step 312 utilizes the spatial parameters of the geometry primitives, performs analytic geometry computations, and determines if the geometry primitives intersect. Generally, this step 312 is done on a general purpose computer.

Bounding Boxes around Objects

As described above, in a spatial simulation, it is important to determine which objects are colliding with each other as the simulation proceeds. As an approximation to the actual shape of each object, a bounding volume is used. Thus, all the bounding volumes can be compared to each other as a first order approximation of the collision detection problem. This reduces the total amount of computation.

Figure 4:
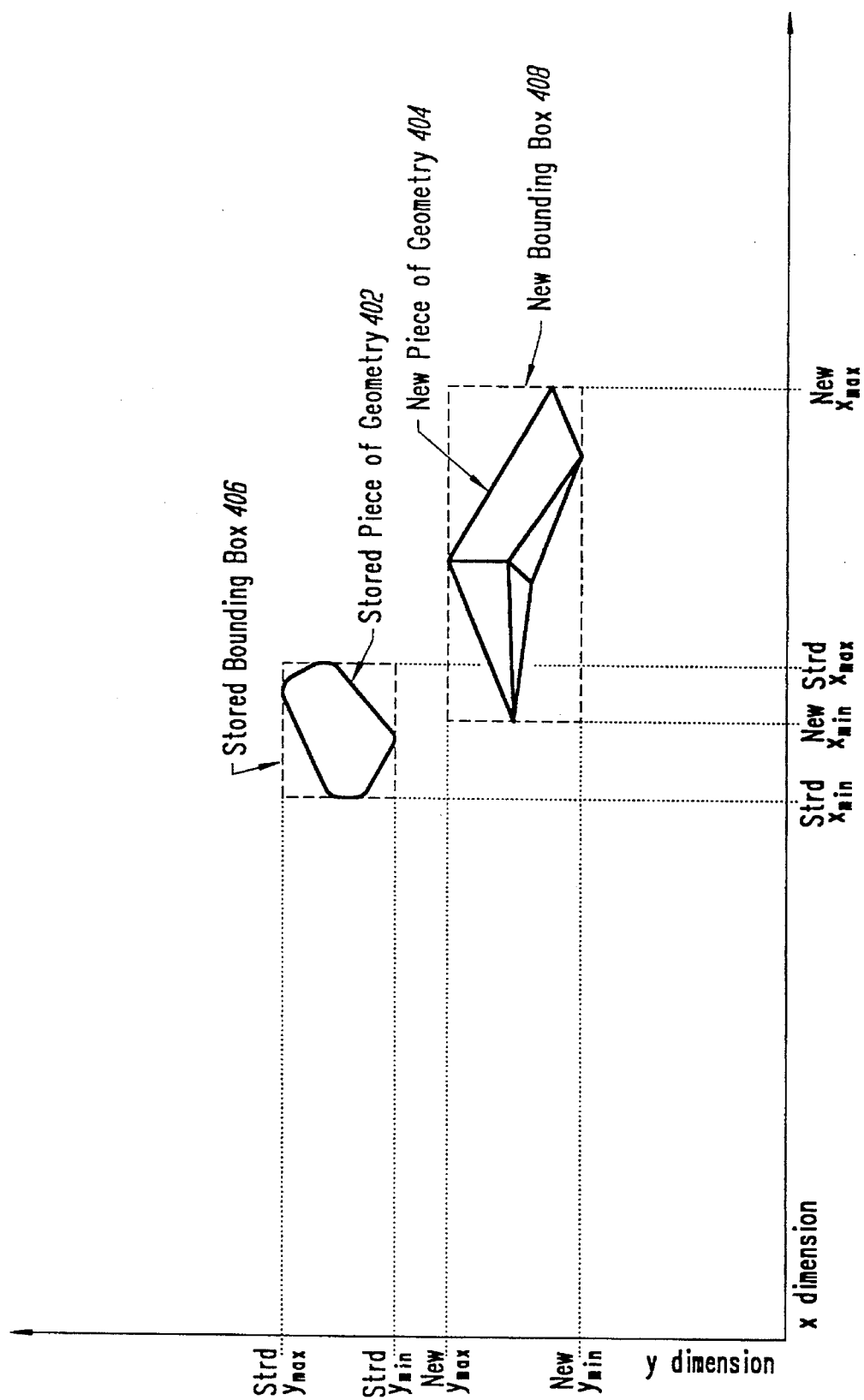

FIG. 4 shows two objects 402, 404, each enclosed by a minimum-sized axially aligned 3D bounding box 406, 408 (hereinafter called simply "bounding box"). For spatial simulations, objects are generally three-dimensional, but for illustrative purposes, only two dimensions will be shown in figures such as FIG. 4.

Bounding boxes are generated by finding the minimum and maximum x, y, and z axis positions within the geometry of the object. However, rather than process the geometry within an object each time a new bounding box needs to be generated (due to the object moving), bounding volume information stored with the geometry is used. For example, an object that has geometry described in object coordinates can also have a bounding sphere in object coordinates. Hence, when a bounding box is needed for this object, the sphere is translated to world coordinates, and then a bounding box is generated for the sphere. More complex shapes than spheres would generally be preferable, but this also requires more computation.

One general approach to describe a bounding volume uses a constellation of points in space around the object such that the convex hull around the points completely encloses the object. This set of points is then translated to world coordinates, and a bounding box is formed around the set. This type of bounding volume is assumed in the balance of this document, however, other types, such as CSG, could be substituted.

For two bounding boxes 406, 408 to intersect, their extents along each axis must overlap. In FIG. 4, the x extents overlap, but the y extents do not. Therefore, these two bounding boxes 406, 408 do not intersect. Thus, the condition of overlapping object bounding boxes, denoted by the logic value ObjectBoxHit, is the conjunction (i.e., the "and") of overlapping of the three extents. This is shown as Equation 1.

$$\text{ObjectBoxHit} = \begin{array}{l} [\text{overlap of } x \text{ extents}] \land \\ [\text{overlap of } y \text{ extents}] \land \\ [\text{overlap of } z \text{ extents}] \end{array} \quad (EQ\ 1)$$

Two extents overlap if and only if the minimum of each extent is less than or equal to the maximum of the other extent. The "equal to" part of the inequality used here implies touching extents overlap, and some applications may want to assume the opposite and use simply "less than". The logical expression for "overlap of extents" is shown as Equation 2.

$$\text{overlap of extents} = \begin{array}{l} [\text{MinOf (first extent)} \leq \\ \text{MaxOf (second extent)}] \land \\ [\text{MinOf (second extent)} \leq \\ \text{MaxOf (first extent)}] \end{array} \quad (EQ\ 2)$$

Substituting Equation 2 into each dimension in Equation 1 yields a conjunction with six terms, ObjectBoxHit(Strd, New), shown as Equation 3. In this equation, the first object is the "stored object" and the second object is the "new object". In Equation 3 and FIG. 4, the x coordinate extent for the stored object is from $x_{min}^{Strd}$ to $x_{max}^{Strd}$. In this notation, the superscript "Strd" indicates the "stored" object, not an exponent. Similarly, the x coordinate extent for the new object is from $x_{min}^{New}$ to $x_{max}^{New}$. The six values, $x_{min}^{Strd}$, $x_{max}^{Strd}$, $y_{min}^{Strd}$, $y_{max}^{Strd}$, $z_{min}^{Strd}$, and $z_{max}^{Strd}$, are called the parameters of the stored bounding box.

$$\text{ObjectBoxHit (Strd, New)} = \begin{array}{l} [x_{min}^{Strd} \leq x_{max}^{New}] \land \\ [x_{min}^{New} \leq x_{max}^{Strd}] \land \\ [y_{min}^{Strd} \leq y_{max}^{New}] \land \\ [y_{min}^{New} \leq y_{max}^{Strd}] \land \\ [z_{min}^{Strd} \leq z_{max}^{New}] \land \\ [z_{min}^{New} \leq z_{max}^{Strd}] \end{array} \quad (EQ\ 3)$$

The minimum and maximum values of the extents along each axis must be generated from all the coordinates of the object (or its bounding volume), as shown in Equation 4. In this equation, the stored object values have all been moved to left side of the inequalities.

$$\text{ObjectBoxHit (Strd, New)} = \begin{array}{l} [\text{MaxOf } (x \text{ coordinates of stored object})] \geq \\ \text{MinOf } (x \text{ coordinates of new object})] \land \\ [\text{MinOf } (x \text{ coordinates of stored object})] \leq \\ \text{MaxOf } (x \text{ coordinates of new object})] \land \\ [\text{MaxOf } (y \text{ coordinates of stored object})] \geq \\ \text{MinOf } (y \text{ coordinates of new object})] \land \\ [\text{MinOf } (y \text{ coordinates of stored object})] \leq \\ \text{MaxOf } (y \text{ coordinates of new object})] \land \\ [\text{MaxOf } (z \text{ coordinates of stored object})] \geq \\ \text{MinOf } (z \text{ coordinates of new object})] \land \\ [\text{MinOf } (z \text{ coordinates of stored object})] \leq \\ \text{MaxOf } (z \text{ coordinates of new object})] \end{array} \quad (EQ\ 4)$$

The logic inverse of ObjectBoxHit(Strd,New) is ObjectBoxMiss(Strd,New), which indicates the bounding boxes do not overlap. ObjectBoxMiss is generated by Equation 5, a disjunction (i.e., an "or") of six terms.

$$\text{ObjectBoxMiss (stored object, new object)} = \begin{array}{l} [\text{MaxOf } (x \text{ coordinates of stored object}) < \\ \text{MinOf } (x \text{ coordinates of new object})] \lor \\ [\text{MinOf } (x \text{ coordinates of stored object}) > \\ \text{MaxOf } (x \text{ coordinates of new object})] \lor \\ [\text{MaxOf } (y \text{ coordinates of stored object}) < \\ \text{MinOf } (y \text{ coordinates of new object})] \lor \\ [\text{MinOf } (y \text{ coordinates of stored object}) > \\ \text{MaxOf } (y \text{ coordinates of new object})] \lor \\ [\text{MaxOf } (z \text{ coordinates of stored object}) < \\ \text{MinOf } (z \text{ coordinates of new object})] \lor \\ [\text{MinOf } (z \text{ coordinates of stored object}) > \\ \text{MaxOf } (z \text{ coordinates of new object})] \end{array} \quad (EQ\ 5)$$

Figure 5:
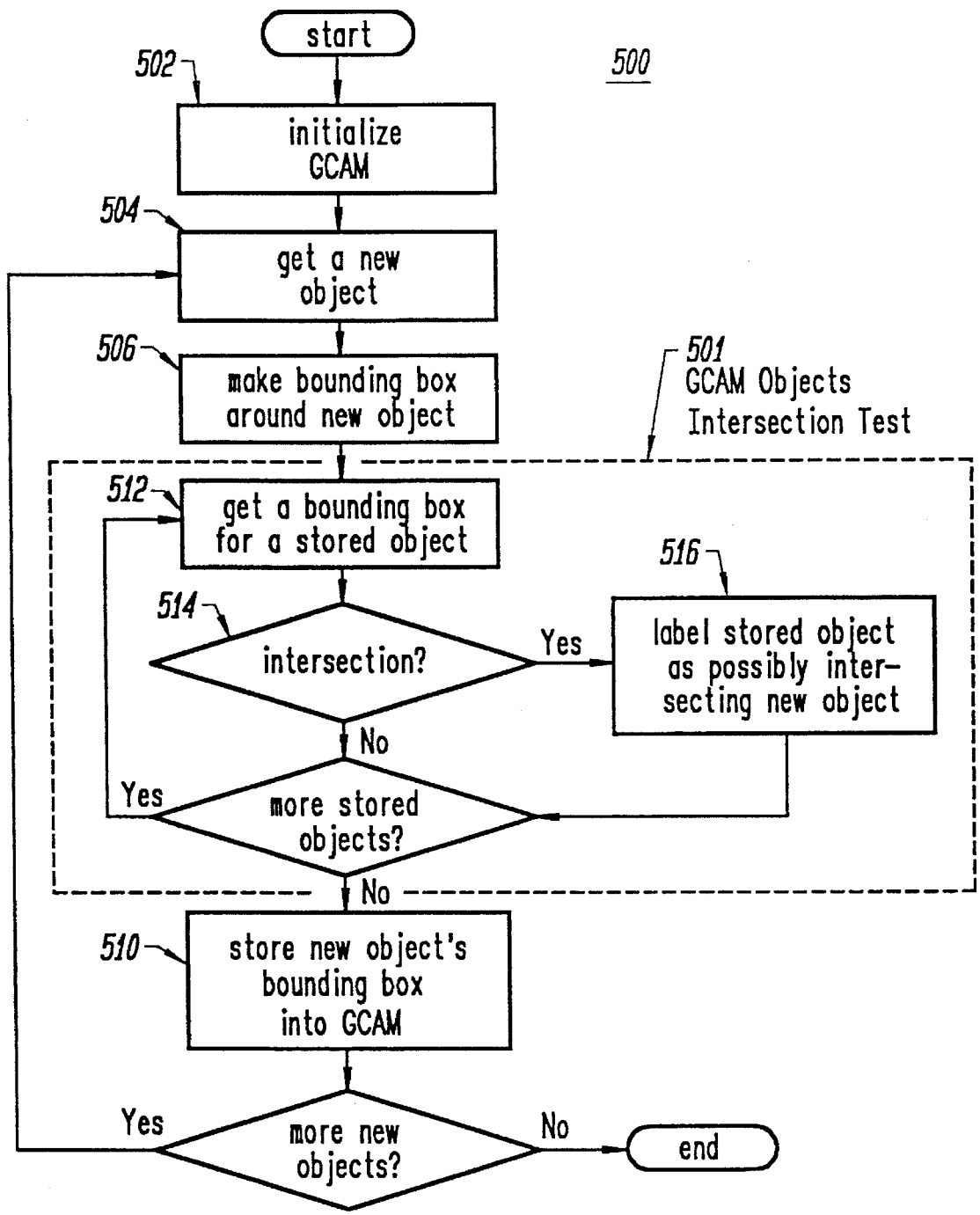

FIG. 5 is a method flow diagram for the Object Processing Step 500 which compares a set of object bounding boxes. At the beginning of a simulation step, the GCAM 1000 is initialized 502, which wipes it clean of all contents. Then, each object is processed by declaring it a "new" object 504, making a bounding box around it 506, subjecting the bounding box to the GCAM Object Intersection Test 508, and then storing 510 the bounding box into the GCAM 1000. The operation of getting 504 a new object may include translating it from its object coordinate system to the world coordinate system. The GCAM Object Intersection Test 501 compares the new object's bounding box to all previously stored bounding boxes. This 501 is done by getting 512 each previously stored bounding box, testing for intersection 514 using Equation 3, Equation 4, Equation 5, or an equivalent equation, and labeling 516 (or adding to a list) objects that may actually intersect because their bounding boxes intersect.

When bounding boxes are stored in the GCAM 1000, each GCAM Word 1100 stores the location of one corner of the bounding box. Hence, two GCAM Words 1100 together store one bounding box. The only requirement on the choice of bounding box corners is that they are diametrically opposite corners. This is necessary because all six parameters for each stored bounding box must be stored in the GCAM 1000, but how they are sorted into the two GCAM Words 1100 does not matter. The six parameters of a bounding box are either: 1) generated externally to the GCAM 1000 and then input; or 2) generated internally by the GCAM 1000 as the constellation of points describing the bounding volume is input. This latter choice requires writing individual Coordinate Fields 1200 depending on the Comparison Results.

Without parallelism, the method flow method of FIG. 5 would take $N(N-1)/2$ bounding box comparisons for N objects, which is $O(N^2)$ operations ($O(N^2)$ is read "order $N^2$"). However, the GCAM 1000 is a set of parallel hardware comparators, and reduces the GCAM Object Intersection Test 508 to a single operation. This changes the method flow method of FIG. 5 to $O(N)$.

As a possible means for further acceleration, only the bounding boxes of moving objects are input to the GCAM 1000, while the bounding boxes of non-moving objects are stored unchanged in the GCAM 1000. This can be done because non-moving objects cannot have new collisions with each other. If this is done, initialization 502 of the GCAM 1000 deletes the bounding boxes of only the moving objects, leaving the bounding boxes of non-moving objects stored in the GCAM 1000. Then, only the moving objects are used as new objects 504 for the GCAM Object Intersection Test 501. This acceleration can be done if the GCAM 1000 is not fully used for collision detection testing on finer geometry primitives for pair of objects whose bounding boxes intersect.

Bounding Boxes around Polygons

When the bounding boxes of two objects do not intersect, then the objects within those bounding boxes do not intersect. When object bounding boxes do intersect, then the objects may intersect. To determine if the objects actually intersect, a better approximation must be used for the surface (or volume) of the objects. Since an object may be composed of subobjects, the bounding boxes of the subobjects can be used, and this can be done recursively until surface polygons (or other primitives) are reached. Thus, when surface polygons are the final approximation for a surface, the collision detection problem becomes a polygon-to-polygon intersection problem. The majority of this document's discussion of poygon-to-polygon intersection uses triangles as the geometry primitive, but polygons with a different number of vertices can easily be substituted with small changes to the method and apparatus.

$$\begin{aligned}\text{TriangleBoxMiss (Strd, New)} = \quad & [\text{MaxOf}(x_1^{Strd}, x_2^{Strd}, x_3^{Strd}) < \\ & \text{MinOf}(x_1^{New}, x_2^{New}, x_3^{New})] \vee \\ & [\text{MinOf}(x_1^{Strd}, x_2^{Strd}, x_3^{Strd}) > \\ & \text{MaxOf}(x_1^{New}, x_2^{New}, x_3^{New})] \vee \\ & [\text{MaxOf}(y_1^{Strd}, y_2^{Strd}, y_3^{Strd}) < \\ & \text{MinOf}(y_1^{New}, y_2^{New}, y_3^{New})] \vee \\ & [\text{MinOf}(y_1^{Strd}, y_2^{Strd}, y_3^{Strd}) > \\ & \text{MaxOf}(y_1^{New}, y_2^{New}, y_3^{New})] \vee \\ & [\text{MaxOf}(z_1^{Strd}, z_2^{Strd}, z_3^{Strd}) < \\ & \text{MinOf}(z_1^{New}, z_2^{New}, z_3^{New})] \vee \\ & [\text{MinOf}(z_1^{Strd}, z_2^{Strd}, z_3^{Strd}) > \\ & \text{MaxOf}(z_1^{New}, z_2^{New}, z_3^{New})] \end{aligned} \quad (EQ\ 6)$$

Figure 6:
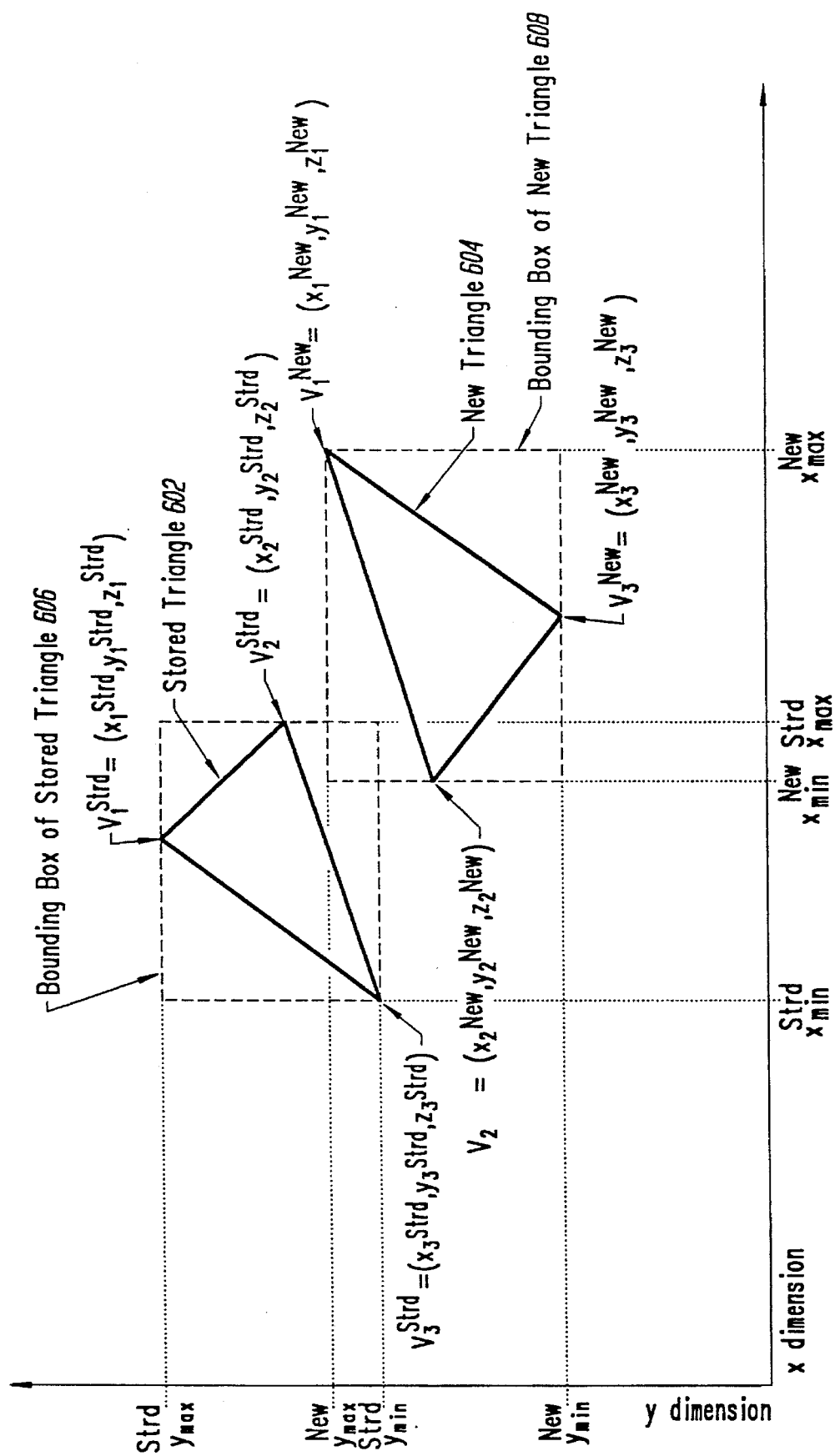

FIG. 6 shows two polygons (in this case, triangles). For polygons, Equation 5 can be changed to operate directly on polygon vertex values, as shown in Equation 6.

$$\begin{aligned}\text{TriangleBoxMiss (Strd, New)} = \quad & (EQ\ 7) \\ [(x_1^{Strd} < x_1^{New}) \wedge (x_2^{Strd} < x_1^{New}) \wedge (x_3^{Strd} < x_1^{New}) \wedge \\ (x_1^{Strd} < x_2^{New}) \wedge (x_2^{Strd} < x_2^{New}) \wedge (x_3^{Strd} < x_2^{New}) \wedge \\ (x_1^{Strd} < x_3^{New}) \wedge (x_2^{Strd} < x_3^{New}) \wedge (x_3^{Strd} < x_3^{New})] \vee \\ [(x_1^{Strd} > x_1^{New}) \wedge (x_2^{Strd} > x_1^{New}) \wedge (x_3^{Strd} > x_1^{New}) \wedge \\ (x_1^{Strd} > x_2^{New}) \wedge (x_2^{Strd} > x_2^{New}) \wedge (x_3^{Strd} > x_2^{New}) \wedge \\ (x_1^{Strd} > x_3^{New}) \wedge (x_2^{Strd} > x_3^{New}) \wedge (x_3^{Strd} > x_3^{New})] \vee \\ [(y_1^{Strd} < y_1^{New}) \wedge (y_2^{Strd} < y_1^{New}) \wedge (y_3^{Strd} < y_1^{New}) \wedge \\ (y_1^{Strd} < y_2^{New}) \wedge (y_2^{Strd} < y_2^{New}) \wedge (y_3^{Strd} < y_2^{New}) \wedge \\ (y_1^{Strd} < y_3^{New}) \wedge (y_2^{Strd} < y_3^{New}) \wedge (y_3^{Strd} < y_3^{New})] \vee \\ [(y_1^{Strd} > y_1^{New}) \wedge (y_2^{Strd} > y_1^{New}) \wedge (y_3^{Strd} > y_1^{New}) \wedge \\ (y_1^{Strd} > y_2^{New}) \wedge (y_2^{Strd} > y_2^{New}) \wedge (y_3^{Strd} > y_2^{New}) \wedge \\ (y_1^{Strd} > y_3^{New}) \wedge (y_2^{Strd} > y_3^{New}) \wedge (y_3^{Strd} > y_3^{New})] \vee \\ [(z_1^{Strd} > z_1^{New}) \wedge (z_2^{Strd} > z_1^{New}) \wedge (z_3^{Strd} > z_1^{New}) \wedge \\ (z_1^{Strd} > z_2^{New}) \wedge (z_2^{Strd} > z_2^{New}) \wedge (z_3^{Strd} > z_2^{New}) \wedge \\ (z_1^{Strd} < z_3^{New}) \wedge (z_2^{Strd} < z_3^{New}) \wedge (z_3^{Strd} < z_3^{New})] \vee \\ [(z_1^{Strd} > z_1^{New}) \wedge (z_2^{Strd} > z_1^{New}) \wedge (z_3^{Strd} > z_1^{New}) \wedge \\ (z_1^{Strd} > z_2^{New}) \wedge (z_2^{Strd} > z_2^{New}) \wedge (z_3^{Strd} > z_2^{New}) \wedge \\ (z_1^{Strd} > z_3^{New}) \wedge (z_2^{Strd} > z_3^{New}) \wedge (z_3^{Strd} > z_3^{New})] \end{aligned}$$

The direct interpretation of Equation 6 requires performing several "MaxOf" and "MinOf" operations, each of which takes two comparisons (or more for polygons with more vertices). Rather than explicitly compute the six pairs of "MaxOf" and "MinOf" computations in Equation 6, each pair can be replaced with a conjunction of nine inequalities, as shown in Equation 7. This would apparently increase the number on arithmetic comparison operations from 24 to 36.

However, as will be shown later, this is more efficient for hardware implementation when polygon meshes are used.

The GCAM 1000 uses three GCAM Words 1100 to store the three vertices of a triangle. For polygons with more vertices, more GCAM Words 1100 are used. A bounding box can be thought of as a "polygon" with only two vertices (i.e., using opposite corners of the bounding box), thus requiring two GCAM Words 1100.

For the example triangles of FIG. 6, the Geometry Processing Step 900 would yield a "true" value for TriangleBoxMiss(Strd,New) (assuming the z extents also overlap), but the Analytic Geometry Step 312 would discover the triangles do not actually intersect.

Bounding Boxes around Polygons within a Polygon Mesh

Figure 7:
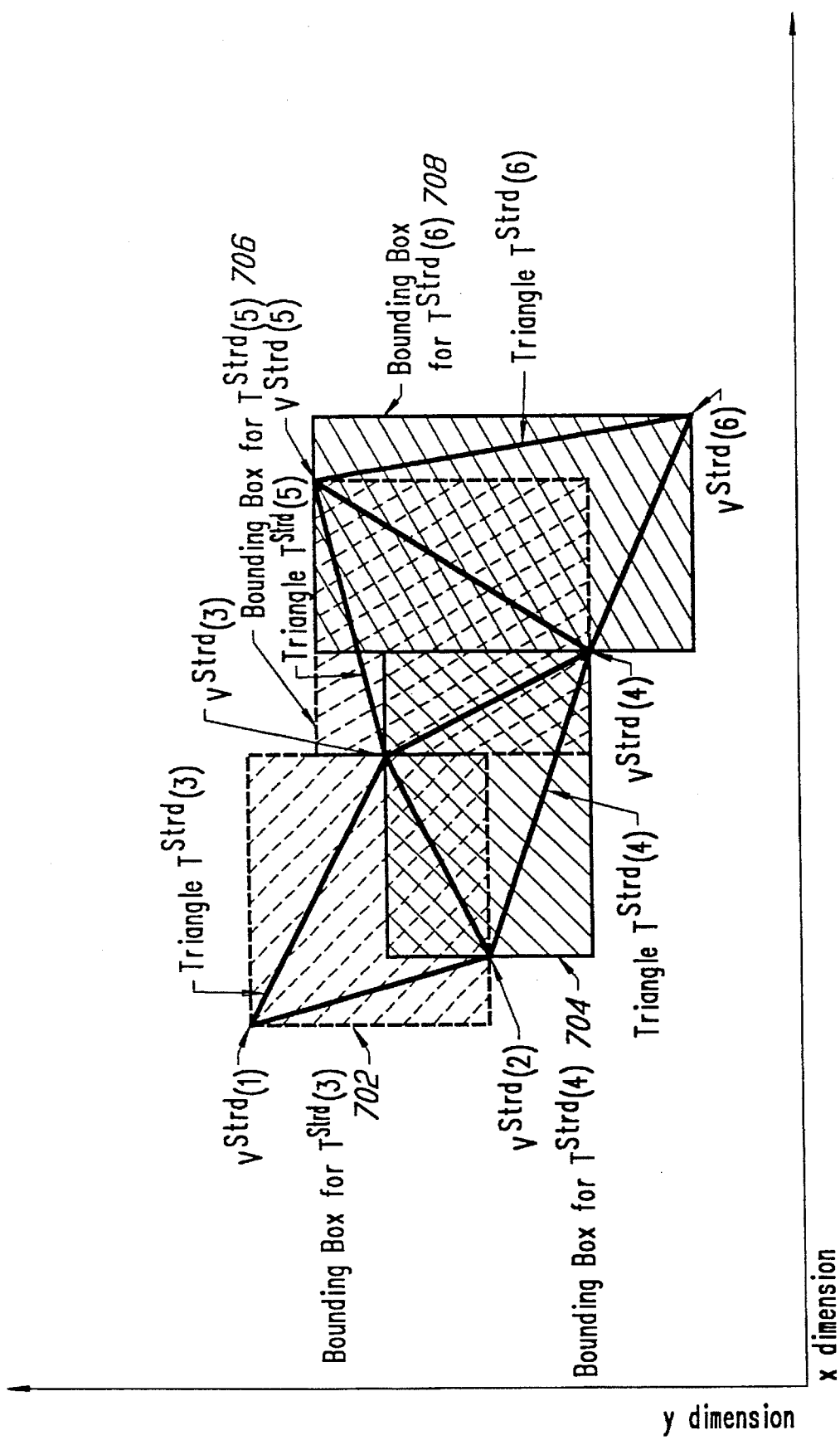

In 3D computer graphics, polygonal surface approximations are typically done utilizing polygon meshes in order to reduce the number of vertices to describe the surface. For example, in FIG. 7, a triangle mesh with four triangles is described by six vertices rather than by 12 vertices which would be required by four independent triangles. In FIG. 7, triangle $T_3$ is described by vertices $V_1$, $V_2$, and $V_3$; while $T_4$ is described by $V_2$, $V_3$, and $V_4$, thereby sharing two vertices. In this document, a triangle's numerical designation is same as that of its last vertex. Also, in 3D computer graphics, quadrilateral meshes are also commonly used, and two vertices are shared between consecutive quadrilaterals in the mesh.

In order to be compatible with the typical 3D graphics database, collision detection processing must process polygons meshes. Hence, the collision detection problem for surface approximations becomes a mesh-to-mesh intersection problem. As shown in FIG. 7, a bounding box can be placed around each polygon in the mesh. Hence, to determine if any of the polygons within two meshes intersect with each other, each polygon bounding box in one mesh must be tested for intersection with each polygon bounding box in the other mesh.

Equation 7 assumes two three-vertex polygons are being compared. Since meshes are a list of vertices that describe multiple polygons, processing polygon meshes requires processing a list of vertices. In this document, the index into a list of stored vertices is n, and the index into a list of new vertices is m.

The definition for the nth stored triangle, $T^{Strd}(n)$, is shown in Equation 8. In this document, a column vector bracketed by "[ ]" is used to define a set, and the symbol "≡" means "defined as".

$$n\text{th stored triangle} \equiv T^{Strd}(n) \equiv \begin{bmatrix} V^{Strd}(n) \\ V^{Strd}(n-1) \\ V^{Strd}(n-2) \end{bmatrix} \quad \text{(EQ 8)}$$

Similarly, the mth new triangle is defined in Equation 9.

$$m\text{th stored triangle} \equiv T^{New}(m) \equiv \begin{bmatrix} V^{New}(m) \\ V^{New}(m-1) \\ V^{New}(m-2) \end{bmatrix} \quad \text{(EQ 9)}$$

Since polygon meshes are a list of vertices, mesh-to-mesh intersection can be done by sequentially processing each vertex in the list. When the mth new vertex is input for processing, it is compared to each stored vertex; and for the nth stored vertex, six arithmetic comparisons are done: $L_x(n, m)$ and $G_x(n, m)$, $L_y(n, m)$, $G_y(n, m)$, $L_z(n, m)$, and $G_z(n, m)$, as defined in Equation 10.

$$C(n, m) \equiv \text{Comparison Result Bits} \equiv \quad \text{(EQ 10)}$$

$$\begin{bmatrix} L_x(n, m) \\ G_x(n, m) \\ L_y(n, m) \\ G_y(n, m) \\ L_z(n, m) \\ G_z(n, m) \end{bmatrix} \equiv \begin{bmatrix} x^{Strd}(n) < x^{New}(m) \\ x^{Strd}(n) > x^{New}(m) \\ y^{Strd}(n) < y^{New}(m) \\ y^{Strd}(n) > y^{New}(m) \\ z^{Strd}(n) < z^{New}(m) \\ z^{Strd}(n) > z^{New}(m) \end{bmatrix}$$

The index, n, indicates a position in the list of stored vertices, and therefore also designates a particular GCAM Word 1100. The index, m, indicates a position in the list of input vertices, and can therefore be considered a time index.

The six arithmetic comparisons for a new vertex, defined in Equation 10, are called Comparison Result Bits, as they are each a binary value. There is a set of Comparison Result Bits for each GCAM Word 1100. For the entire set of N stored vertices (in a total of N GCAM Words 1100), the collection of all the Comparison Result Bits (a total of 6N binary values) is called the Comparison Result. In the GCAM 1000, the new Comparison Result is temporarily saved in registers within the Coordinate Miss Detects 1300 within the GCAM Words 1100.

For compactness of expression, the following set of six definitions are made:

$$\text{Comparison Conjuctions} \equiv \begin{bmatrix} L_x(n) \\ G_x(n) \\ L_y(n) \\ G_y(n) \\ L_z(n) \\ G_z(n) \end{bmatrix} \equiv \quad \text{(EQ 11)}$$

$$\begin{bmatrix} L_x(n, m-2) \wedge L_x(n, m-1) \wedge L_x(n, m) \\ G_x(n, m-2) \wedge G_x(n, m-1) \wedge G_x(n, m) \\ L_y(n, m-2) \wedge L_y(n, m-1) \wedge L_y(n, m) \\ G_y(n, m-2) \wedge G_y(n, m-1) \wedge G_y(n, m) \\ L_z(n, m-2) \wedge L_z(n, m-1) \wedge L_z(n, m) \\ G_z(n, m-2) \wedge G_z(n, m-1) \wedge G_z(n, m) \end{bmatrix}$$

Each of the six definitions in Equation 11, each called a Comparison Conjunction, is the conjunction of a bit from each of $C(n, m)$, $C(n, m-1)$, and $C(n, m-2)$.

To form a function for TriangleBoxMiss(n) for the nth stored triangle and the current (that is, the mth) new triangle, the definitions of Equation 10 are substituted into Equation 7, and then the definitions of Equation 11 are used to form Equation 12.

TriangleBoxMiss (n) = (EQ 12)

StrdTriangleInvld $(n)$ $\vee$ NewTriangleInvld $(m)$ $\vee$ $[L_x(n-2) \wedge L_x(n-1) \wedge L_x(n)]$ $\vee$ $[G_x(n-2) \wedge G_x(n-1) \wedge G_x(n)]$ $\vee$ $[L_y(n-2) \wedge L_y(n-1) \wedge L_y(n)]$ $\vee$ $[G_y(n-2) \wedge G_y(n-1) \wedge G_y(n)]$ $\vee$ $[L_z(n-2) \wedge L_z(n-1) \wedge L_z(n)]$ $\vee$ $[G_z(n-2) \wedge G_z(n-1) \wedge G_z(n)]$ Because a triangle mesh with v vertices describes v–2 triangles, the first two vertices in a triangle mesh do not define triangles. This requires introducing a mechanism for invalidating (i.e., labelling as a "miss") comparisons made for invalid polygons. The mechanism included in Equation 12 uses the two functions, StrdTriangleInvld(n) and NewTriangleInvld(m), which are each binary values that are true for invalid triangles. If the nth stored vertex does not complete a triangle, then StrdTriangleInvld(n) is given the value "true", thereby forcing TriangleBoxMiss(n) to be true (by Equation 12) for all values of m.

If the mth new vertex, $V^{New}(m)$, completes a triangle, then the new Comparison Result, along with previously generated Comparison Results, are input to Equation 12, which then generates TriangleBoxMiss(n) for every value of n. For a particular n, Equation 12 uses nine sets of Comparison Result Bits. This is because each of the three vertices of the new triangle must be compared to each of the three vertices of the stored triangle. For simple triangle meshes that always replace the oldest vertex, only three sets of Comparison Results are ever needed at the same time.

A more general form of TriangleBoxMiss(n) is called PlyBoxMs(n) 1402, which indicates that the nth stored polygon does not intersect the mth new polygon. The apparatus described later in this document uses the signal name PlyBoxMs(n) 1402.

Figure 8:
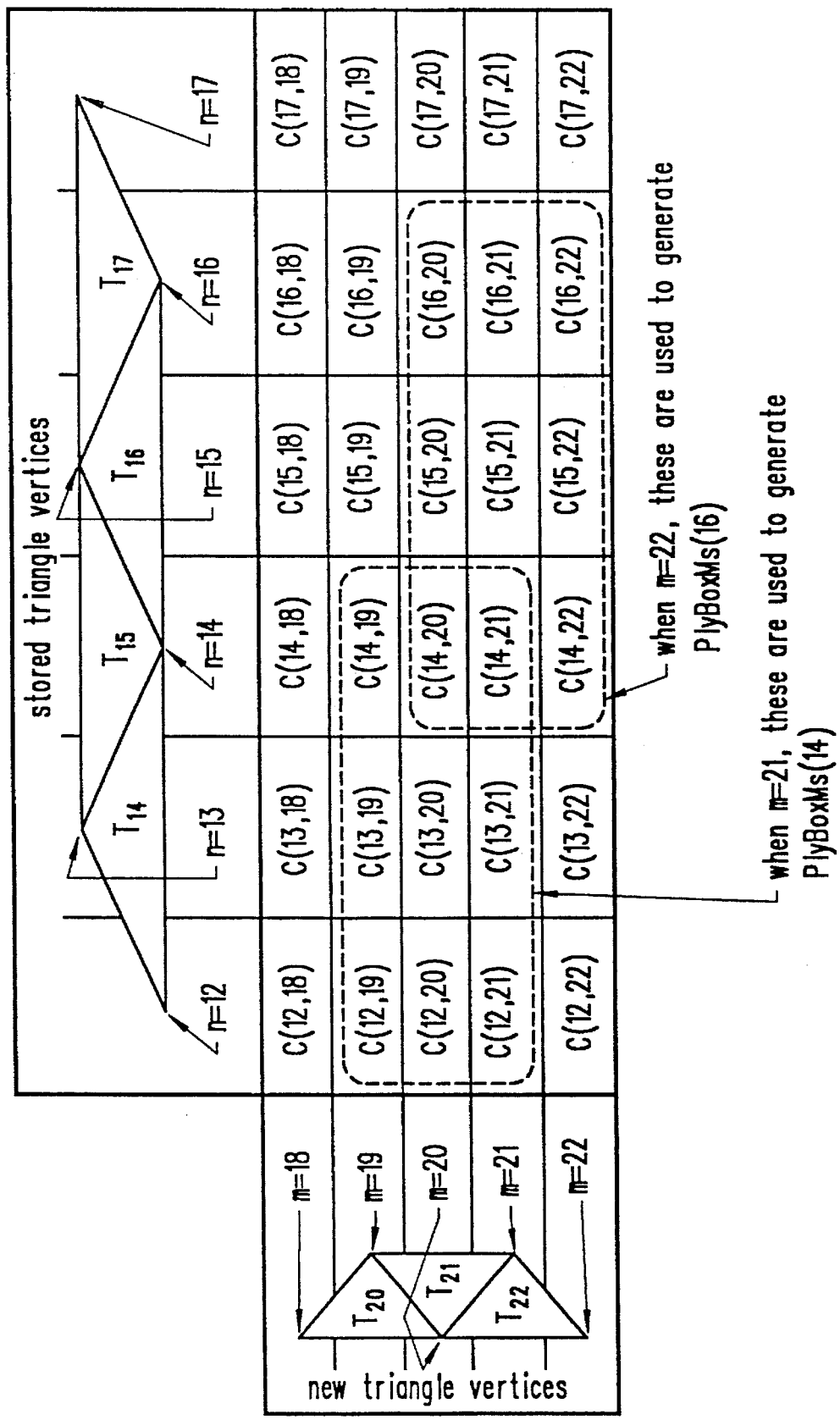

FIG. 8 shows how Comparison Result Bits are combined to generate values for PlyBoxMs(n) 1402. Vertices stored in the GCAM are represented by columns in the figure (only values for n between 12 and 17, inclusive, are shown), and new vertices are represented by rows. Each particular row/column cell corresponds to a particular n,m pair and also to particular Comparison Result Bits, C(n,m). As an example, for n=14 and m=21, PlyBoxMs(14) is formed by applying Equation 12 while new vertex 21 is being input to the GCAM 1000, and the nine Comparison Result Bits used to generate PlyBoxMs(14) are indicated in FIG. 8.

Figure 9:
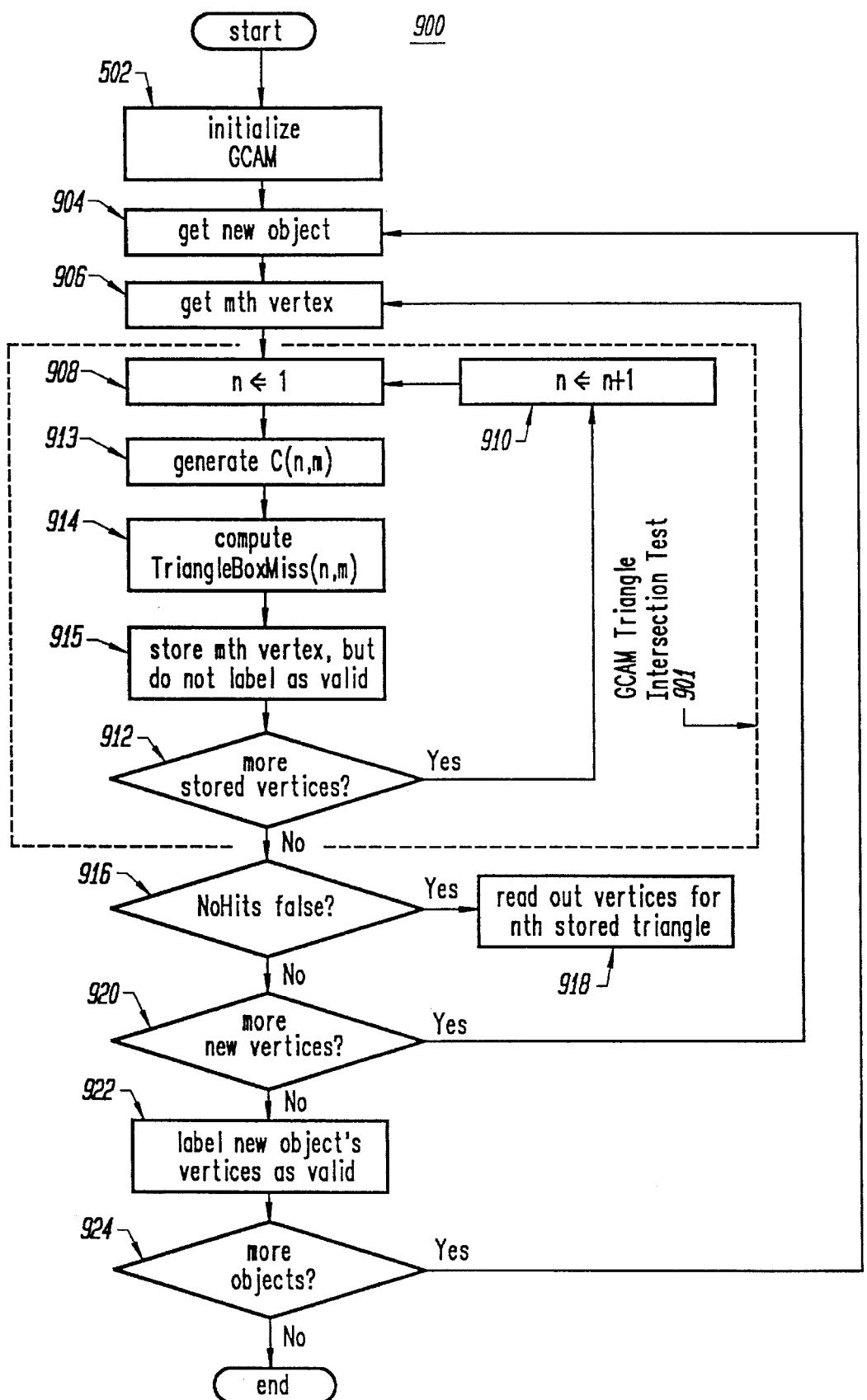

FIG. 9 is a method flow diagram for the Geometry Processing Step 900 which takes a set of potentially intersection objects and compares their surface polygons (in this case, triangles). At the beginning of the step 900, the GCAM 1000 is initialized 502, which wipes it clean of all contents. Then, each object is processed by declaring it a "new" object 904, and processing each 906 of its vertices (each vertex labelled the mth) by invoking the GCAM Triangle Intersection Test 901. The process of getting 906 the mth vertex may include translating the vertex from object coordinates to world coordinates.

The GCAM Triangle Intersection Test 901 compares the mth new vertex to all previously stored vertices. This is done by starting with the first 908 stored vertex and stepping 910 through all the stored vertices until 912 no more are left to compare. Each comparison between the mth new vertex and the nth stored vertex causes the generation 913 of a set of Comparison Result Bits, as defined in Equation 11. Next, a value for TriangleBoxMiss(n), or, as called later, PlyBoxMs(n) 1402, is computed 914 by using Equation 12. A false value for a particular TriangleBoxMiss(n), or PlyBoxMs(n) 1402, indicates the nth stored triangle potentially intersects the current (mth) input triangle. In addition to the above computations 913, 914, the new vertex is also stored 915 into the GCAM, but is not yet labelled as a valid vertex. The GCAM 1000 hardware performs the GCAM Triangle Intersection Test 901 in parallel, so all three operations 913, 914, 915 for a particular m are performed at the same time (or at least within the same clock cycle) in every GCAM Word 1100.

At the completion of the GCAM Triangle Intersection Test 901, the GCAM 1000 hardware generates the signal, NoHits 1602, by performing a conjunction of all the PlyBoxMs(n) 1402 values (for a particular value of m). That is, NoHits 1602 is false if any of the PlyBoxMs(n) 1402 bits are false. If 916 the signal, NoHits 1602, is false, then the GCAM Words 1100 corresponding to the potentially intersecting triangles are read out 918 of the GCAM 1000 (i.e., the GCAM Words 1100 where PlyBoxMs(n) 1402 is false). The data read 918 from the GCAM 1000 can be one or more of: 1) the actual vertex positions; 2) Tags for the vertices; or 3) Tags for the polygons. The data read 918 from the GCAM 1000 is saved for input to the Analytic Geometry Step 312.

If 920 more new vertices need to be input for the current object, then the next vertex is obtained 906. If 920, for the current object, all the vertices have been input, then the vertices of the current object are labelled 922 as validly stored in the GCAM 1000. The current object's vertices need to be stored into the GCAM 1000 in order to be considered "stored" for the next set of input vertices from the next object. When a new vertex is input to the GCAM 1000, its numerical values are input to every GCAM Word 1100 for arithmetic comparisons; but, at the same time, the new vertex is stored into the next available GCAM Word 1100. However, these newly stored vertices are not labelled as valid until all the vertices from the same object have been input for comparison. This prevents the GCAM 1000 from erroneously detecting an object's polygons colliding with themselves. When the first object is input, no objects are yet stored, and no collisions are detected because no vertices are labelled valid until the first object is completely input.

Storing Bounding Boxes as Two-point Polygons

The GCAM apparatus must be able to store and compare both bounding boxes and polygon meshes. Bounding boxes can be thought of as a two-point polygons whose vertices are opposite corners of the bounding box. Hence, as bounding boxes are input to the GCAM 1000, they can be properly processed if Equation 11 is modified to ignore C(n, m−2). This can be done by supplying an additional signal for disabling this one set of Comparison Result Bits 1104. However, a more general solution allows any of the Comparison Result Bits 1104 to be disabled.

$$\begin{bmatrix} L_x(n) \\ G_x(n) \\ L_y(n) \\ G_y(n) \\ L_z(n) \\ G_z(n) \end{bmatrix} \equiv \begin{bmatrix} [L_x(n, m-2) \lor D(m-2)] \land [L_x(n, m-1) \lor D(m-1)] \land [L_x(n, m) \lor D(m)] \\ [G_x(n, m-2) \lor D(m-2)] \land [G_x(n, m-1) \lor D(m-1)] \land [G_x(n, m) \lor D(m)] \\ [L_y(n, m-2) \lor D(m-2)] \land [L_y(n, m-1) \lor D(m-1)] \land [L_y(n, m) \lor D(m)] \\ [G_y(n, m-2) \lor D(m-2)] \land [G_y(n, m-1) \lor D(m-1)] \land [G_y(n, m) \lor D(m)] \\ [L_z(n, m-2) \lor D(m-2)] \land [L_z(n, m-1) \lor D(m-1)] \land [L_z(n, m) \lor D(m)] \\ [G_z(n, m-2) \lor D(m-2)] \land [G_z(n, m-1) \lor D(m-1)] \land [G_z(n, m) \lor D(m)] \end{bmatrix} \quad \text{(EQ 13)}$$

Equation 13 is a modified version of Equation 11, where a disjunction is performed between each Comparison Result Bit and a disable signal. For example, $L_x(n, m-2)$ is "or-ed" with the disable signal, D(m−2) 1352. If D(m−2) 1352 is true, then the value of $L_x(n, m-2)$ does not affect the Comparison Conjunction $L_x(n)$, and therefore $L_x(n, m-2)$ is disabled.

If the full generality is not needed, only D(m−2) 1352 is required since both D(m−1) 1354 and D(m) 1356 are generally false for bounding boxes and triangles. However, the apparatus described hereinafter will use the three disable bits included in Equation 13.

A similar mechanism can be used for the bounding boxes stored in the GCAM 1000. That is, a set of disable signals, E(n, k), could be included in each GCAM Word 1100 that would disable Comparison Conjunction Bits which would otherwise affect the value of TriangleBoxMiss(n), or PlyBoxMs(n) 1402, as defined in Equation 12. Such a modified version of Equation 12 is shown as Equation 14.

$$\text{TriangleBoxMiss}(n) = \text{StrdTriangleInvld}(n) \lor \text{NewTriangleInvld}(m) \lor \quad \text{(EQ 14)}$$
$$[[L_x(n-2) \lor E(n, n-2)] \land [L_x(n-1) \lor E(n, n-1)] \land [L_x(n) \lor E(n, n)]] \lor$$
$$[[G_x(n-2) \lor E(n, n-2)] \land [G_x(n-1) \lor E(n, n-1)] \land [G_x(n) \lor E(n, n)]] \lor$$
$$[[L_y(n-2) \lor E(n, n-2)] \land [L_y(n-1) \lor E(n, n-1)] \land [L_y(n) \lor E(n, n)]] \lor$$
$$[[G_y(n-2) \lor E(n, n-2)] \land [G_y(n-1) \lor E(n, n-1)] \land [G_y(n) \lor E(n, n)]] \lor$$
$$[[L_z(n-2) \lor E(n, n-2)] \land [L_z(n-1) \lor E(n, n-1)] \land [L_z(n) \lor E(n, n)]] \lor$$
$$[[G_z(n-2) \lor E(n, n-2)] \land [G_z(n-1) \lor E(n, n-1)] \land [G_z(n) \lor E(n, n)]]$$

A drawback with the strategy of Equation 14 is that three register bits must be added to each GCAM Word 1100, namely E(n, k) for k=n, n−1, and n−2. However, a significant advantage to the strategy of both Equation 13 and Equation 14 is they are easily expanded to polygons with more than three vertices. This can be done by utilizing more disable signals and more Comparison Conjunction Bits.

$$\text{TriangleBoxMiss}(n) = \quad \text{(EQ 15)}$$
$$\text{StrdTriangleInvld}(n) \lor \text{NewTriangleInvld}(m) \lor$$
$$[[L_x(n-2) \lor \text{DisableOldest}(n)] \land L_x(n-1) \land L_x(n)] \lor$$
$$[[G_x(n-2) \lor \text{DisableOldest}(n)] \land G_x(n-1) \land G_x(n)] \lor$$
$$[[L_y(n-2) \lor \text{DisableOldest}(n)] \land L_y(n-1) \land L_y(n)] \lor$$
$$[[G_y(n-2) \lor \text{DisableOldest}(n)] \land G_y(n-1) \land G_y(n)] \lor$$
$$[[L_z(n-2) \lor \text{DisableOldest}(n)] \land L_z(n-1) \land L_z(n)] \lor$$
$$[[G_z(n-2) \lor \text{DisableOldest}(n)] \land G_z(n-1) \land G_z(n)]$$

An alternate solution to Equation 14, shown in Equation 15, is to add a single disable signal, which disables only the third vertex. Thus, this disable bit, called DisableOldest(n) 1508, is used to chose between a polygon with three vertices (a triangle) and a polygon with two vertices (a bounding box). The GCAM apparatus described hereinafter includes the solution shown in Equation 15, however, that of Equation 14 can be easily substituted.

GCAM Apparatus

FIG. 10 is a diagram of the GCAM 1000 data and circuit organization. The GCAM 1000 consists of a multiplicity of GCAM Words 1100, each of which is a horizontal slice though FIG. 10. The figure is illustrated this way to emphasize the regular structure of the GCAM 1000 and its ease of implementation as a VLSI circuit. FIG. 10 could be used as a floorplan for an integrated circuit, but optimization of an actual floorplan would depend on concerns such as number of horizontal and vertical metal lines and transistor layout.

FIG. 10 shows a total of W GCAM Words 1100. Hereinafter, it is assumed that N GCAM Words 1100 store valid data, and the typical GCAM Word 1100 being described in this document is the nth word 1100. The first GCAM Word 1100, labelled word 0, is the highest priority GCAM Word 1100 and is therefore the first GCAM Word 1100 written when a new set of data is stored into the GCAM 1000.

The main data stored within each GCAM Word 1100 is the x, y, and z coordinates of a vertex. These coordinates are each stored in a Coordinate Field 1200. Corresponding to each Coordinate Field 1200 is a Coordinate Miss Detect 1300, which determines if that coordinate (x, y, or z) causes the stored item in that GCAM Word 1100 to be labelled a Miss (equivalently, not a Hit). If any Coordinate Miss Detect 1300 determines the stored item is not a Hit, then the status flag Hit(n) 1602 is turned off. The independent outputs from each Coordinate Miss Detect 1300 are gated together in the Polygon Miss Detect 1400.

Each GCAM Word 1100 includes a Tag Field 1102 for storing an identifier (or, in computer science terms, a pointer) for the item stored in that word 1100. A Tag can identify, for example, an object bounding box, a graphics primitive, and/or an individual polygon. When bounding boxes are stored, the Tag Field 1102 would generally store an identifier for an object. The identifier maybe a set of pointers for traversing the hierarchical data structure.

The GCAM 1000 generally does not include a standard address decoder, as is commonly used in conventional random access memory (although one could be added as shown in the Duluk Patent). Rather, GCAM Words 1100 are written or read depending on the status within the GCAM Words 1100 themselves. This is done by inputting an entire set of appropriate status bits into a "find-the-first-one" circuit, called the Priority Resolver 1800.

For example, when writing data into the GCAM 1000, the Priority Resolver 1800 locates the first GCAM Word 1100 which does not have valid data (using the values InvalidData(n) in every GCAM Word 1100), and then that GCAM Word 1100 is enabled for writing. Also, during the spatial query process, when the GCAM 1000 identifies potential collisions between input and stored objects and/or polygons, the stored items are labelled as Hits. This labelling is done by turning on a bit, Hit(n) 1602, in GCAM Words 1100 representing those potentially colliding items. When a read operation is desired, the Priority Resolver 1800 is used to find the first GCAM Word 1100 where Hit(n) 1602 is asserted. As shown in FIG. 10, the Priority Resolver 1800 is spread over the entire set of GCAM Words 1100, and the portion of the Priority Resolver 1800 located within a particular GCAM Word 1100 is called a Priority Resolve Bit 1700.

GCAM Word 1100

Figure 11:
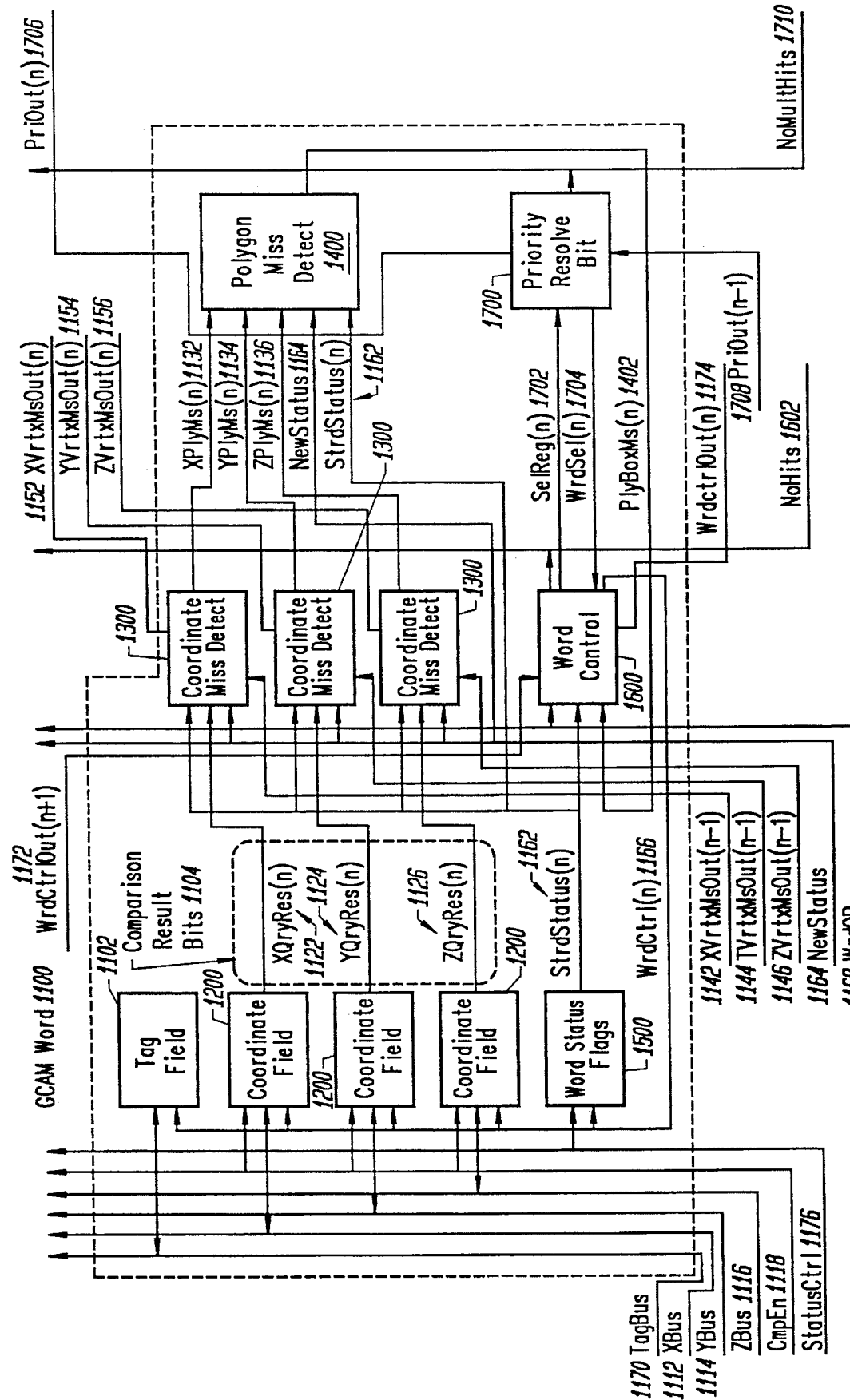

FIG. 11 is a block diagram of the nth GCAM Word 1100. Included in each GCAM Word 1100 is three Coordinate Fields 1200, three Coordinate Miss Detects 1300, one Polygon Miss Detect 1400, one Word Status Flags 1500, one Word Control 1600, and one Priority Resolve Bit 1700. As described above, each Coordinate Field 1200 stores one of the three coordinate values, and functions as a read/write memory. However, the Coordinate Field 1200 also performs arithmetic comparisons between the stored coordinate value and the value input on one of the three coordinate input busses, labelled XBus 1112, YBus 1114, and ZBus 1116. Comparisons are initiated by the signal CmpEn 1118. The output of the arithmetic comparisons are XQryRes(n) 1122, YQryRes(n) 1124, or ZQryRes(n) 1126, which together comprise the Comparison Result Bits 1104.

The Comparison Result Bits 1104 are input to their respective Coordinate Miss Detect 1300, which then determines if that respective coordinate causes the stored item (bounding box, polygon, etc.) to miss (i.e., not collide with) the newly input item. The miss condition is output from each Coordinate Miss Detect 1300 on its corresponding output signal XPlyMs(n) 1132, YPlyMs(n) 1134, or ZPlyMs(n) 1136. These outputs are dependent on Comparison Conjunctions from previous GCAM Words 1100, and these values are input on the busses XVrtxMsOut(n−1) 1142, YVrtxMsOut(n−1) 1144, and ZVrtxMsOut(n−1) 1146, which come from the previous GCAM Word 1100. Hence, the GCAM Word 1100 outputs its Comparison Conjunction values on XVrtxMsOut(n) 1152, YVrtxMsOut(n) 1154, and ZVrtxMsOut(n) 1156.

The outputs 1132, 1134, 1136 from the Coordinate Miss Detects 1300 are input to the Polygon Miss Detect 1400, which computes the value of PlyBoxMs(n) 1402 (or TriangleBoxMiss(n)), as defined in Equation 12, Equation 14, or Equation 15. This computation also requires status information for both the stored item and the new item, supplied on the signal busses StrdStatus(n) 1162 and NewStatus 1164, respectively.

The output from Polygon Miss Detect 1400, PlyBoxMs(n) 1402, is input to Word Control 1600. Word Control 1600 is responsible for controlling reading and writing of the GCAM Word 1100 through the use of the bus WrdCtrl 1166, which includes the read and write control signals. Reading and writing of all the GCAM Words 1100 is controlled by the bus WrdOp 1168, which specifies the operation of the GCAM 1000. Since items stored in the GCAM 1000 normally span multiple GCAM Words 1100, control information is received from the next GCAM Word 1100 on the bus WrdCtrlOut(n+1) 1172, and control information is output to the previous GCAM Word 1100 on the bus WrdCtrlOut(n) 1174. Word Control 1600 also generates the signal NoHits 1602, which is a wired-or of PlyBoxMs(n) 1402 from every GCAM Word 100.

As described above, the GCAM 1000 uses the Priority Resolver 1800 to find the first GCAM Word 1100 with a hit or invalid data. The Word Control 1600 supplies the signal SelReq(n) 1702 to the Priority Resolver 1800, and the asserted state of this signal means the GCAM Word 1100 is requesting to be read or written. Since many GCAM Words 1100 can make this request at the same time, the Priority Resolver 1800 selects one GCAM Word 1100 by asserting its WrdSel(n) 1702, indicating that one GCAM Word 1100 is selected for reading or writing. The Priority Resolver 1800 takes input from every GCAM Word 1100, and therefore is shown in FIG. 10 as part of every word 1100. One simple way of implementing the Priority Resolver 1800 is to daisy chain a set of Priority Resolve Bit 1700 circuits together, where the output of each is called PriOut(n) 1706 and the input is PriOut(n−1) 1708. PriOut(n−1) 1708 acts as an enable input to the Priority Resolve Bit 1700, which enables 1706 the next GCAM Word 1100 when the nth word 1100 is enabled 1708 but is not requesting a read or write. The Priority Resolver 1800 also generates the signal NoMultHits 1602, which is a wired-or signal indicating that there is more than one hit which needs to be read. The NoMultHits 1602 signal is needed during a read operation to determine whether subsequent reads are needed due to multiple hits.

The status of the GCAM Word 1100 is stored in the Word Status Flags 1500, and the status is output on the bus StrdStatus(n) 1162 which includes the four signals: InvlidData(n) 1502, StrdPlyInvld(n) 1504, ReplaceOldest(n) 1506, and DisableOldest(n) 1508. Word Status Flags 1500 is controlled by StatusCtrl 1176.

As pointed out in the Deering Reference, there are many possible forms for a triangle mesh to take because a new vertex in a mesh can replace either the oldest or middle vertex of the previous triangle. To account for these two choices, the signal ReplaceOldest(n) 1506 is stored in the Word Status Flags 1500.

The GCAM Word 1100 also includes a Tag Field 1102, which is used to store the identifier for the item stored in the GCAM Word 1100. When polygons are stored, the identifier is for the polygon completed by the vertex stored in the GCAM Word 1100. The Tag Field 1102 is conventional RAM with its input/output bus labelled TagBus 1170, and standard RAM circuit techniques can be used to build this part of the GCAM Word 1100. If searching for certain identifiers or classes of identifiers is needed, then the Tag Field 1102 could be made of conventional (i.e., bit-for-bit equality testing) CAM. Making the Tag Field 1102 do arithmetic comparisons is generally not necessary because the Tag is not a number, it is an address (i.e., pointer) to additional information.

The following signals and busses are broadcast to all the GCAM Words 1100 at the same time: 1) TagBus 1170; 2) XBus 1112; 3) YBus 1114; 4) ZBus 1116; 5) CmpEn 1118; 6) StatusCtrl 1176; 7) NewStatus 1164; and 8) WrdOp 1168. The following signals are wired-or signals, and outputs from every GCAM Word 1100 are connected: 1) NoHits 1602; and 2) NoMultHits 1710.

Coordinate Field 1200

Figure 12:
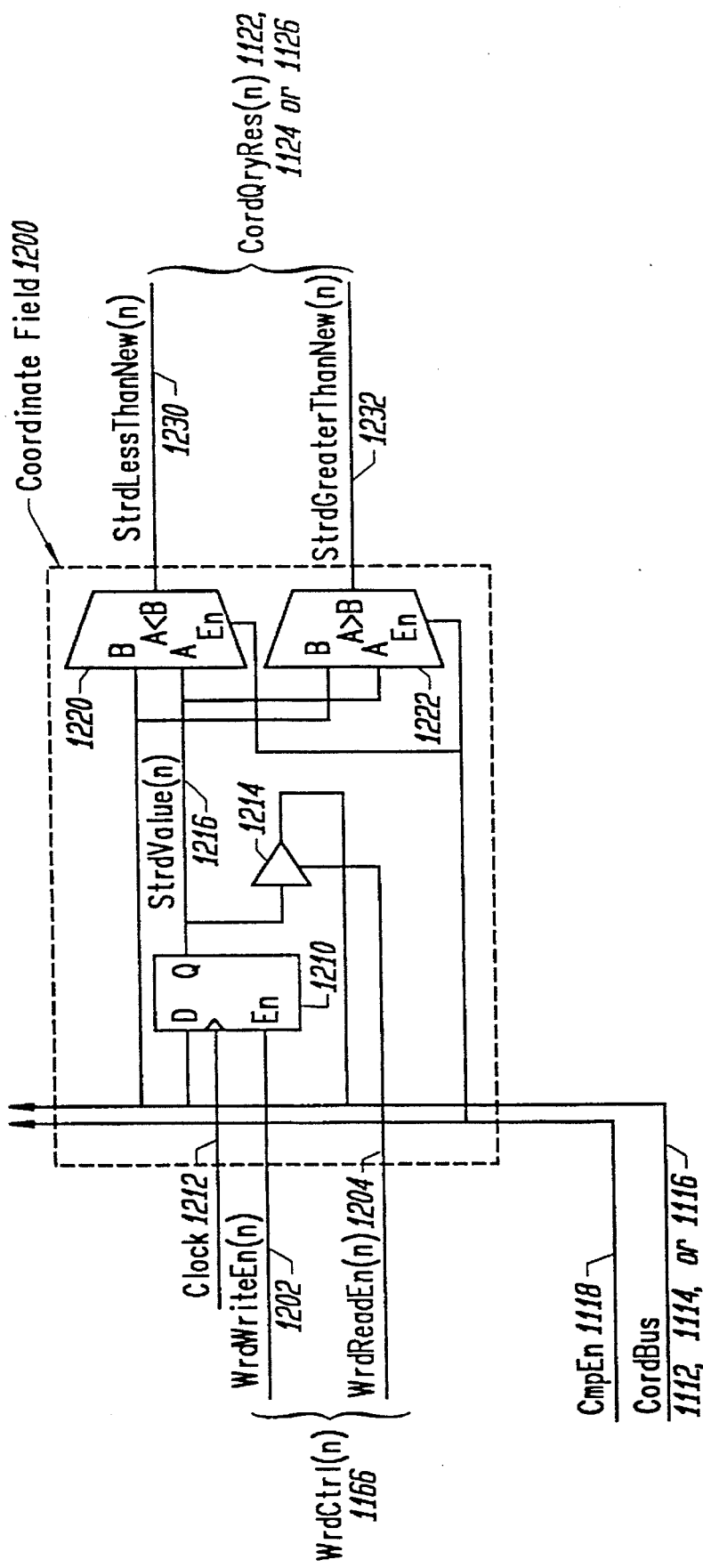

FIG. 12 is a circuit for the Coordinate Field 1200 portion of the GCAM Word 1100. It 1200 includes a multiple-bit register 1210 for storing the coordinate value. The register 1210 is clocked by the signal Clock 1212, but it 1210 is written only when the clock edge is enabled by WrdWriteEn(n) 1202. The register 1210 is read when the tristate buffer 1214 is enabled by WrdReadEn(n) 1202. The data is input to the register (and output from the tristate buffer 1214) via the CordBus 1112, 1114, or 1116. The output from the register 1210 is StrdValue(n) 1216, and it 1216 is compared to the data on CordBus 1112, 1114, or 1116 by the arithmetic comparators 1120, 1122 when enabled by CmpEn 1118. The outputs from the comparators 1120, 1122 are StrdLessThanNew(n) 1230 and StrdGreaterThanNew(n) 1230, which together form CordQryRes(n) 1122, 1124, or 1126.

Coordinate Miss Detect 1300

Figure 13:
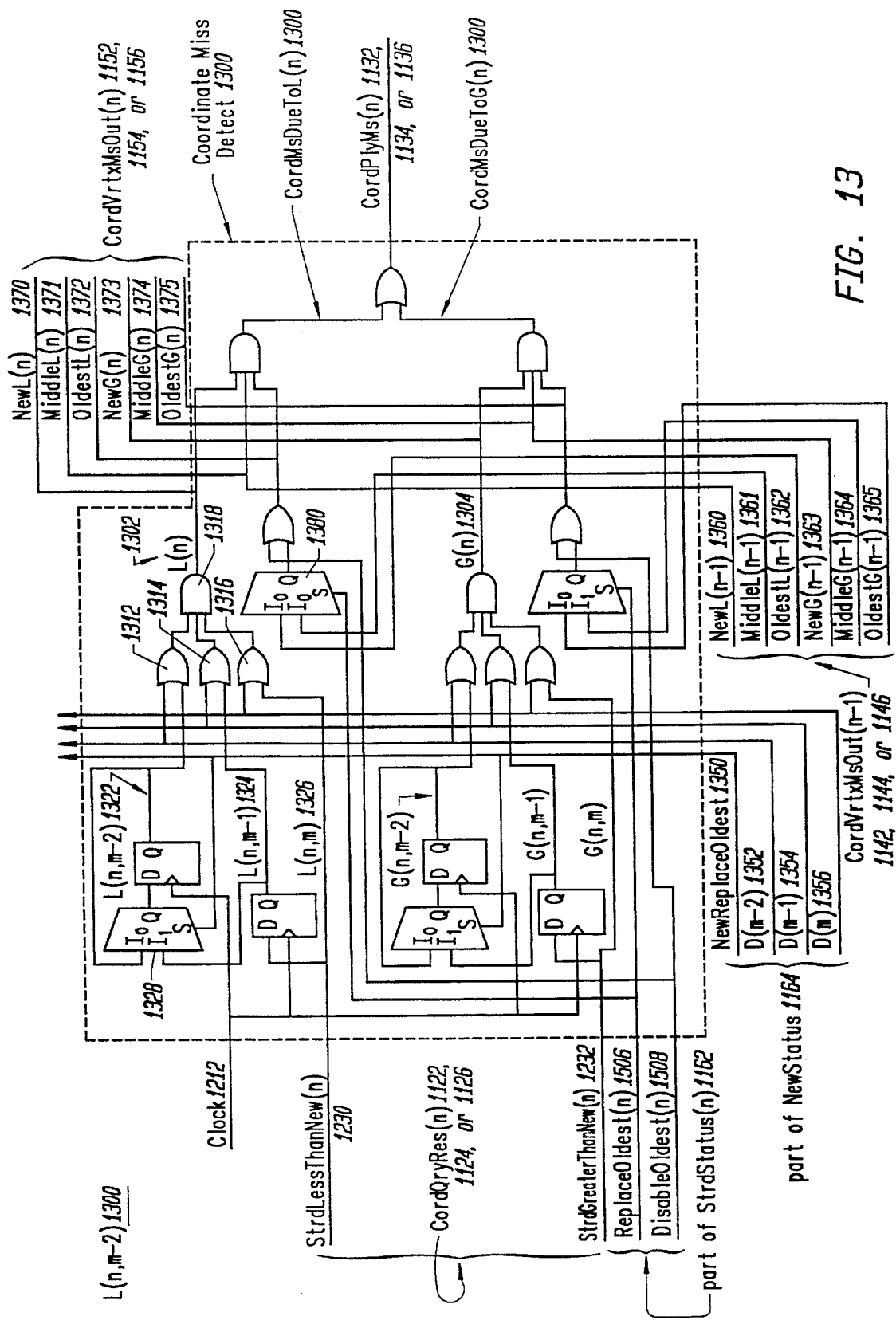

FIG. 13 is a circuit for the Coordinate Miss Detect 1300 portion of the GCAM Word 1100. The primary inputs are the Comparison Result Bits, StrdLessThanNew(n) 1230 and StrdGreaterThanNew(n) 1230, which together form CordQryRes(n) 1122, 1124, or 1126. The Comparison Conjunction, L(n) 1302, as defined in Equation 13 (the subscript x, y, or z is missing because the same circuit 1300 is used for each coordinate), is formed by conditionally 1312, 1314, 1316 and-ing 1318 together the appropriate Comparison Result Bits 1322, 1324, 1326. The Comparison Result Bit, L(n, m−2) 1322, for the oldest vertex for the new polygon is selected by a multiplexor 1328 controlled by NewReplaceOldest 1350. The signal NewReplaceOldest 1350, when asserted, indicates the new vertex (the mth) replaces the (m−2)th vertex. When not asserted, NewReplaceOldest 1350 indicates the new vertex (the mth) replaces the (m−1)th vertex. The Comparison Conjunction, G(n) 1304, is generated in a similar way.

If the extent of the stored polygon (x, y, or z extent) is wholly less than (does not overlap) the extent of the new polygon (same coordinate axis), then the signal CordMsDueToL(n) 1340 is asserted. If the stored extent is wholly greater than the new one, then CordMsDueToG(n) 1342 is asserted. If either of these conditions are true, then the stored polygon (or bounding box, etc.) cannot intersect, and CordPlyMs(n) 1132, 1134, or 1136 is asserted.

CordMsDueToL(n) 1340 is formed by:

$$\text{CordMsDueToL}(n) = \quad Ln \wedge \text{New}L(n-1) \wedge \quad \text{(EQ 16)}$$
$$[\text{DisableOldest}(n) \vee$$
$$(\text{ReplaceOldest}(n) \wedge \text{Middle}L(n-1)) \vee$$
$$(\text{ReplaceOldest}(n) \wedge \text{Oldest}L(n-1))]$$

which is a function of L(n) 1302, NewL(n−1) 1360, MiddleL(n−1) 1361, OldestL(n−1) 1362, DisableOldest(n) 1508, and ReplaceOldest(n) 1506. Equation 16 is one of the conjunction terms of Equation 15 modified to include the ReplaceOldest(n) 1506 signal. ReplaceOldest(n) 1506 controls a multiplexor 1380 which chooses between the Comparison Conjunctions corresponding to the middle or oldest vertices in the previous GCAM Word's 1100 triangle. In a similar fashion, CordMsDueToG(n) 1342 is formed from G(n) 1304, NewG(n−1) 1363, MiddleG(n−1) 364, OldestG(n−1) 1365, DisableOldest(n) 1508, and ReplaceOldest(n) 1506.

Since the Coordinate Miss Detect 1300 requires Comparison Conjunctions corresponding to the new, middle, and oldest vertices of the previous polygon, the signals NewL(n) 1370, MiddleL(n) 1371, OldestL(n) 1372, NewG(n) 1370, MiddleG(n) 1371, and OldestG(n) 1372, are output together as a bus called CordVrtxMsOut(n) 1152, 1154, or 1156, and input to the next GCAM Word 1100.

Polygon Miss Detect 1400

Figure 14:
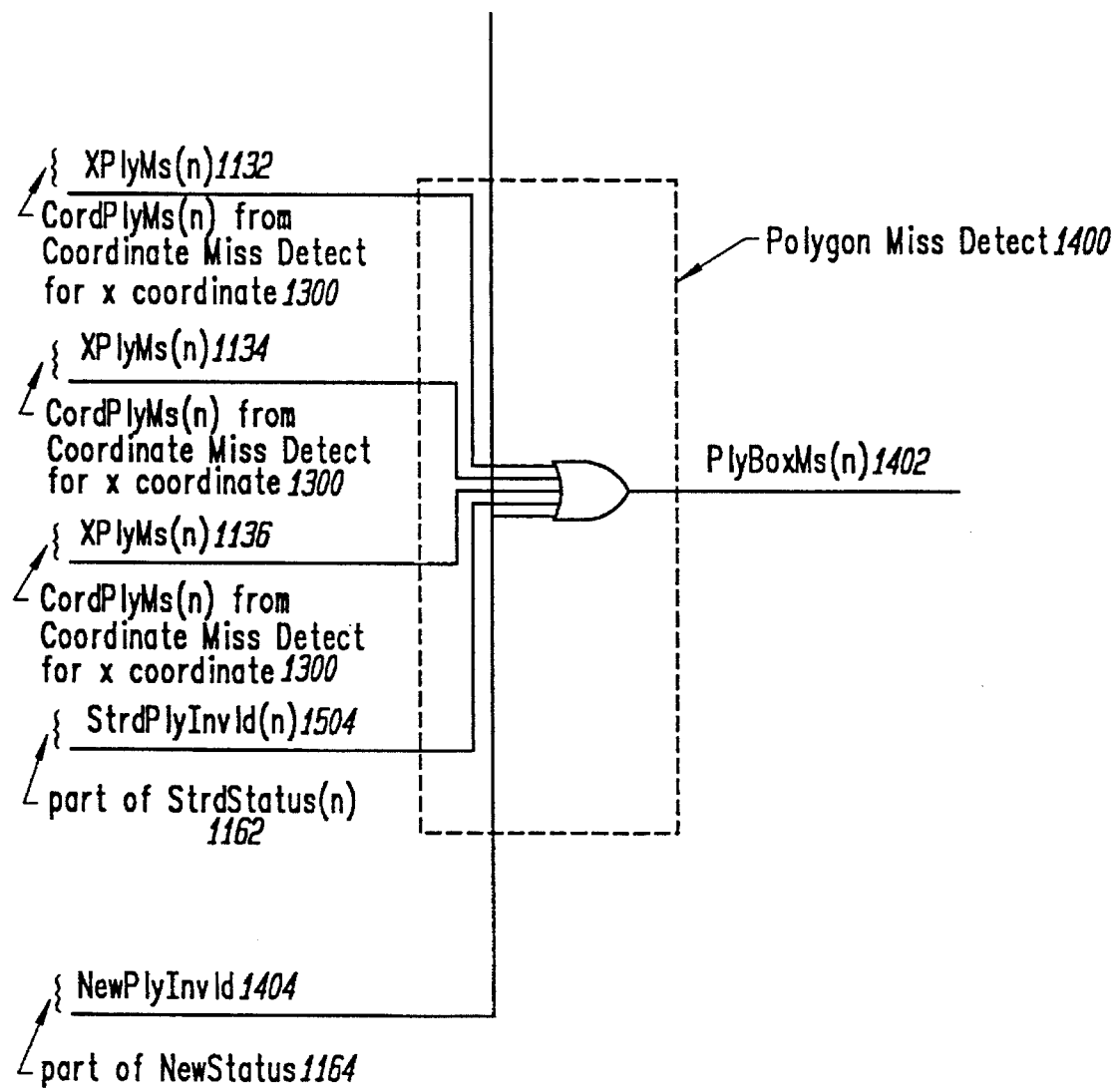

FIG. 14 is a circuit for the Polygon Miss Detect 1400 portion of the GCAM Word 1100. The outputs 1132, 1134, 1136 from the Coordinate Miss Detects 1300 are input to the Polygon Miss Detect 1400, which computes the value of PlyBoxMs(n) 1402, as defined in Equation 12, Equation 14, or Equation 15. This computation is done as the disjunction of five signals. Included in the disjunction is NewPlyInvld 1404 which indicates that the newly input vertex does not correspond to a valid polygon (or bounding box, etc.).

Word Status Flags 1500

Figure 15:
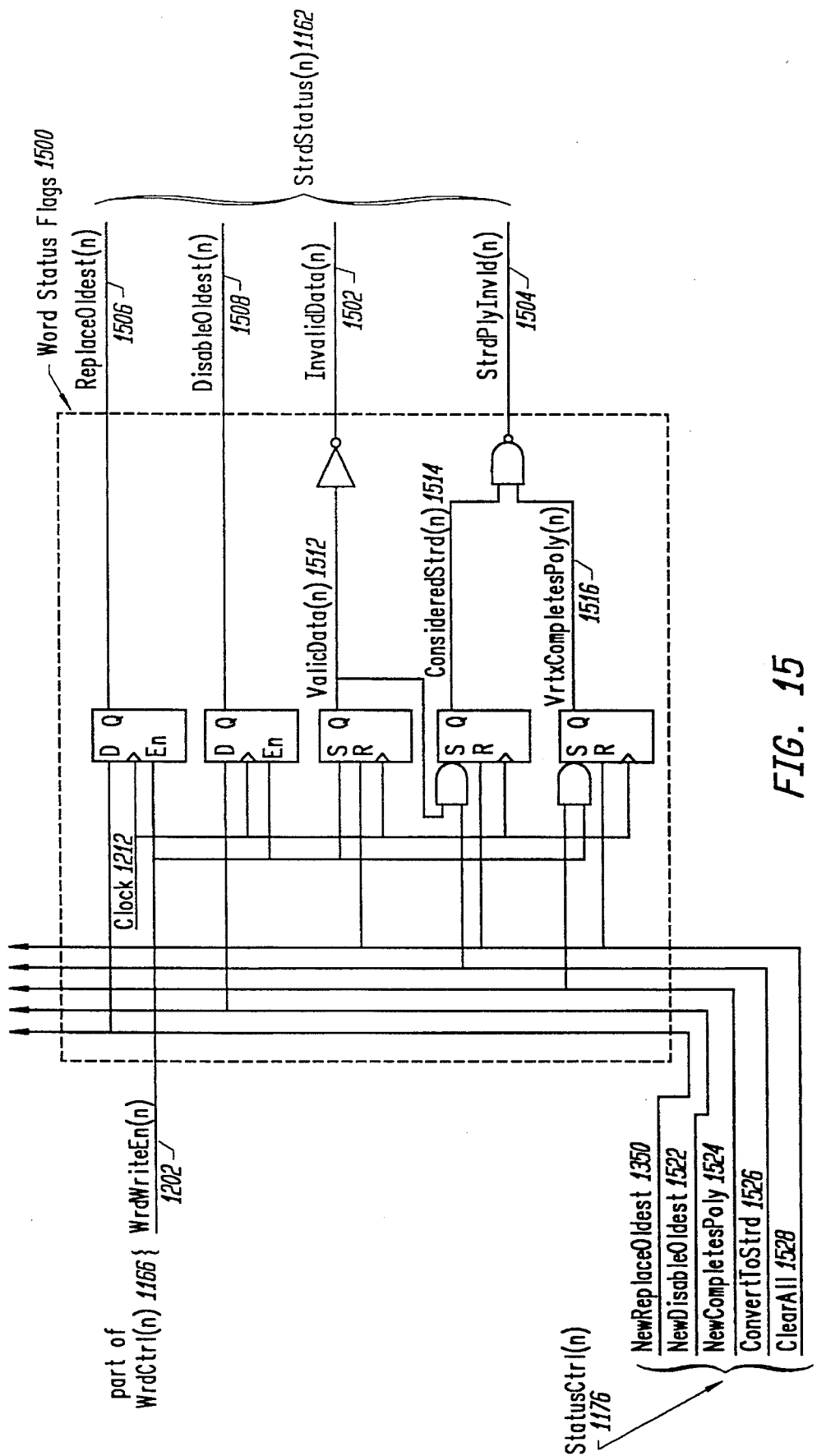

FIG. 15 is a circuit for the Word Status Flags 1500, a portion of the GCAM Word 1100 that stores the word's 1100 status bits. The status bits include: InvalidData(n) 1502, StrdPlyInvld(n) 1504, ReplaceOldest(n) 1506, and DisableOldest(n) 1508. InvalidData(n) 1502, when asserted, indicates the data stored in the word 1100 is invalid, and can be overwritten. StrdPlyInvld(n) 1504, when asserted, indicates the vertex stored in the word 1100 does not correspond to a valid polygon (or bounding box, etc.). ReplaceOldest(n) 1506, when asserted, indicates that the vertex stored in the word 1100 has replaced the oldest vertex of the previous polygon in the mesh. DisableOldest(n) 1508, when asserted, indicates that the completed by the word 1100 does not use the oldest vertex of the previous polygon in the mesh (this is generally used for bounding boxes).

Word Status Flags 1500 is controlled by StatusCtrl 1176, which is a bus of: NewReplaceOldest 1350, NewDisableOldest 1522, NewCompletesPoly 1524, ConvertToStrd 1526, and ClearAll 1528. When the GCAM 1000 is initialized, ClearAll 1528 is asserted, which clears ValidData(n) 1512, ConsideredStrd(n) 1514, and VrtxCompletesPoly(n) 1512. When a vertex is written into the GCAM 1000, the one GCAM Word 1100 selected for writing has its WrdWriteEn(n) 1202 signal asserted, which causes, on the rising edge of Clock 1212, the following to occur in the selected word: 4) ValidData(n) 1512 is asserted; 2) NewReplaceOldest 1350 becomes the new value of ReplaceOldest(n) 1506; 3) NewDisableOldest 1522 becomes the new value of ReplaceOldest(n) 1506; and 4) NewCompletesPoly 1524 becomes the new value of VrtxCompletesPoly(n) 1512. When all the vertices of an object have been input, and all possibly colliding polygons have been read out of the GCAM 1000, then all the new object's vertices written into the GCAM 1000 need to be converted from "new" to "stored". This is done by asserting the signal ConvertToStrd 1526, which causes all GCAM Words 1100 which have their ValidData(n) 1512 is asserted to have their ConsiderStrd(n) 1514 also asserted.

GCAM Words 1100 are cleared together, written one at a time, and read one at a time. Selectively deleting (or invalidating) some of the stored data is not generally for the collision detection application, but this feature could be added to the GCAM 1000.

Word Control 1600

Figure 16:
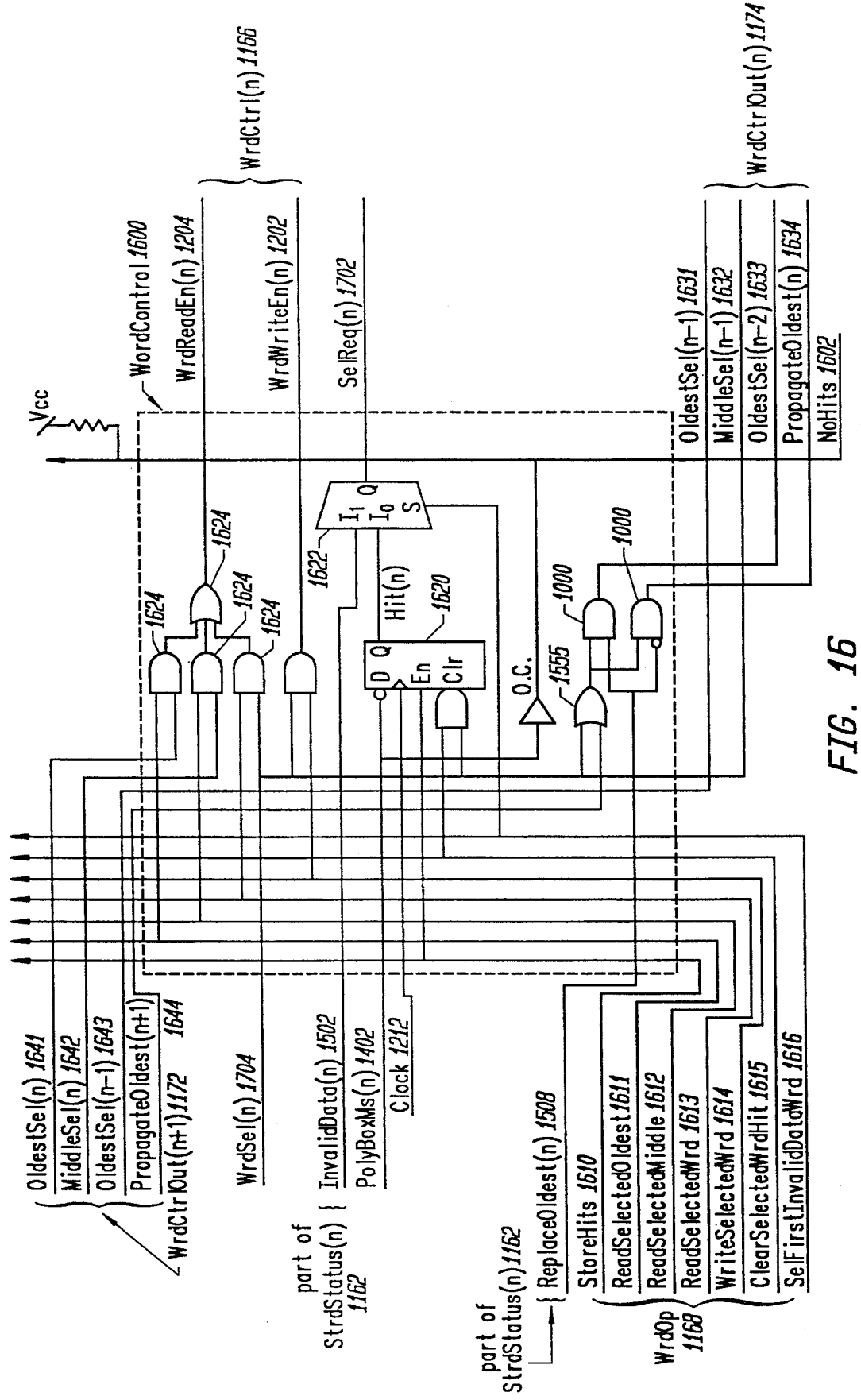

FIG. 16 is a circuit for the Word Control 1600 portion of the GCAM Word 1100. It controls writing and reading of the GCAM Word 1100 by asserting either WrdwriteEn(n) 1202 or WrdReadEn(n) 1204.

During a clock cycle when a spatial query is performed, StoreHits 1610 is asserted, causing the output from Polygon Miss Detect 1400, PlyBoxMs(n) 1402, to be inverted and stored into a register 1620. This happens in all GCAM Words 1100 because each word 1100 participates in the spatial query.

When a write operation is performed, SelFirstInvalidDataWrd 1616 is asserted, causing the multiplexor 1622 to select the InvalidData(n) 1502 flag as the value for SelReq(n) 1502. The Priority Resolver 1800 finds the first GCAM Word 1100 where SelReq(n) 1502 is asserted, and asserts that word's 1100 WrdSel(n) 1704, thereby making it the selected word 1100 for the write, leaving all other word's WrdSel(n) 1704 de-asserted. Also during the write operation, WriteSelectedWrd 1614 is asserted, causing the selected word's WrdWriteEn(n) 1202 to be asserted, causing data to be written into the word's 1100 Coordinate Fields 1200 and Tag Field 1102.

When a read operation is performed, SelFirstInvalidDataWrd 1616 is deasserted, causing the multiplexor 1622 to select the Hit(n) 1602 flag as the value for SelReq(n) 1502. The Priority Resolver 1800 finds the first GCAM Word 1100 where SelReq(n) 1502 is asserted, and asserts that word's 1100 WrdSel(n) 1704, thereby making that word's 1100 stored polygon (or bounding box, etc.) selected for reading, leaving all other word's WrdSel(n) 1704 deasserted. Since the selected item can span many words 1100, each of those words 1100 must be chosen in turn for the read operation. The choosing is done by asserting one of three control signals: 1) ReadSelectedOldest 1611, which selects the oldest vertex in the polygon; 2) ReadSelectedMiddle 1612, which selects the middle vertex in the polygon; or 3) ReadSelectedWrd 1613, which selects the newest vertex in the polygon, namely the one with WrdSel(n) 1704 asserted. This causes one GCAM Word 1100 to assert its WrdReadEn(n) 1204 by the and-or circuit 1624 that performs Equation 15.

$$\text{WrdReadEn}(n) = \quad [\text{ReadSelectedOldest} \wedge \text{OldestSel}(n)] \vee \quad \text{(EQ 17)}$$
$$[\text{ReadSelectedMiddle} \wedge \text{MiddleSel}(n)] \vee$$
$$[\text{ReadSelectedWrd} \wedge \text{WrdSel}(n)]$$

Hence, for the read operation, one of the following words 1100 are generally read: 1) the nth word 1100 where WrdSel(n) 1704 asserted, containing the newest vertex; 2) the (n−1)th word 1100, one prior to the word 1100 where WrdSel(n) 1704 asserted, containing the middle vertex; or 3) the (n−2)th word 1100, second prior to the word 1100 where WrdSel(n) 1704 asserted, containing the oldest vertex. The exception to this is in determining the oldest vertex, which maybe stored in a word 1100 prior to the (n−2)th. Since ReplaceOldest(n) 1508 maybe deasserted, then the oldest vertex from the previous polygon in the mesh is kept, and the middle vertex is replaced. If this is the case, then the (n−3)th word 1100 is read rather than the (n−2)th. However, if ReplaceOldest(n−1) 1508, in the previous word 1100, is also deasserted, then the (n−4)th word 1100 is read. Saving the oldest vertex from the previous polygon propagates back to prior words 1100 as long as ReplaceOldest(n) 1508 is deasserted in those words. The need to do this propagation is indicated by the assertion of PropagateOldest(n) 1634, which tells the previous word 1100 to turn off its output, ReplaceOldest(n−2) 1508.

The output bus from one GCAM Word's 1100 Word Control 1600 to the previous word's Word Control 1600 is WrdCtrlOut(n) 1174. WrdCtrlOut(n) 1174 is composed of the signals: 1) OldestSel(n−1) 1631, which indicates the previous word 1100, the (n−1)th word 1100, maybe selected for reading by asserting ReadSelectedOldest 1611; 2) MiddleSel(n−1) 1632, which indicates the previous word 1100, the (n−1)th word 1100, maybe selected for reading by asserting ReadSelectedMiddle 1612; 3) OldestSel(n−2) 1631, which indicates the second previous word 1100, the (n−2)th word 1100, maybe selected for reading by asserting ReadSelectedOldest 1611; and 4) PropagateOldest(n) 1634, as described above. Similarly, the input from the next GCAM Word 1100 into the Word Control 1600 is the four signal bus, WrdCtrlOut(n) 1174, composed of: 1) OldestSel(n) 1641; 2) MiddleSel(n) 1642; 3) OldestSel(n−1) 1641; and 4) PropagateOldest(n+1) 1644.

While the last word 1100 for a polygon (or bounding box, etc.) is read, Hit(n) 1602 is cleared in the selected GCAM Word 1100 by asserting ClearSelectedWrdHit 1615. This allows subsequent reads to select another polygon.

Priority Resolve Bit 1700

Figure 17:
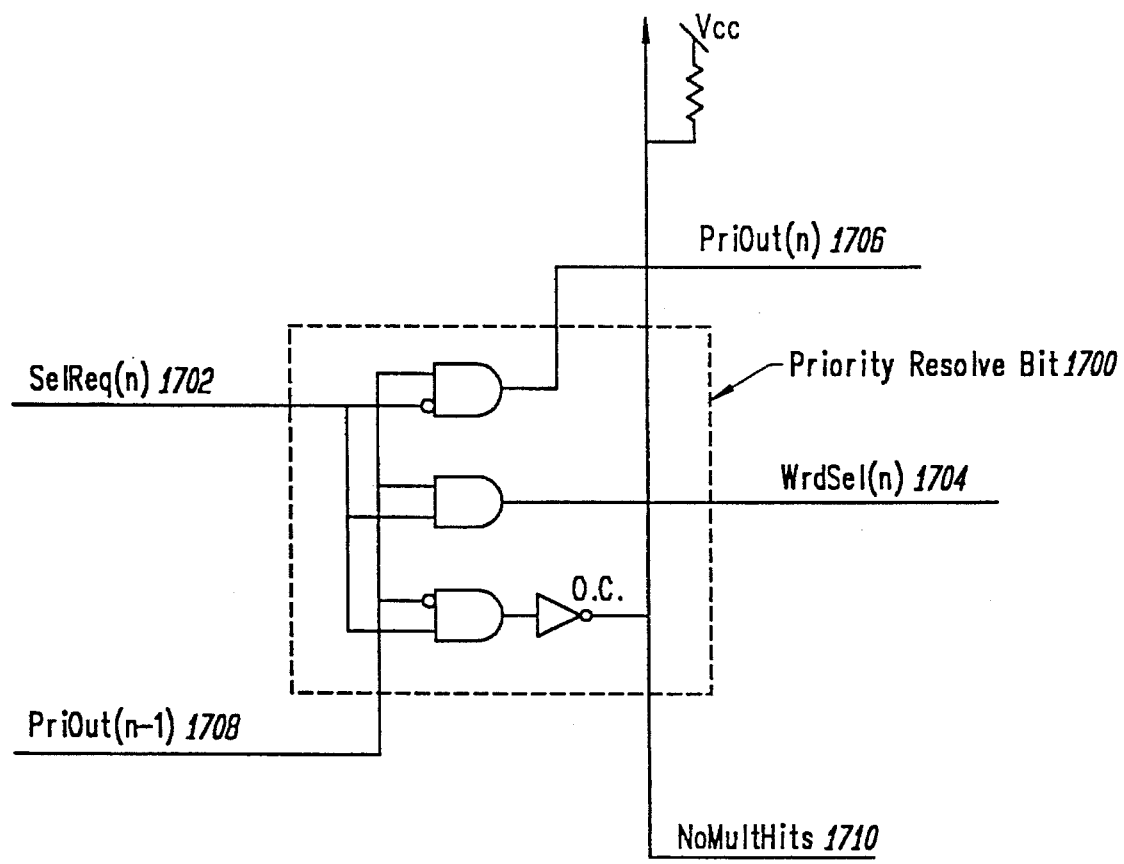

FIG. 17 is a circuit for the Priority Resolve Bit 1700 portion of the GCAM Word 1100. If SelReq(n) 1702 is not asserted, this circuit 1700 propagates a daisy chain enable, PriOut(n−1) 1708, from the previous GCAM Word 1100 to the next GCAM Word 1100 via PriOut(n) 1706. If SelReq(n) 1702 is asserted, and PriOut(n−1) 1708 is also asserted, then WrdSel(n) 1704 is asserted, indicated the word 1100 is selected for reading or writing.

Priority Resolver 1800 with a Tree Structure

Figure 18A:
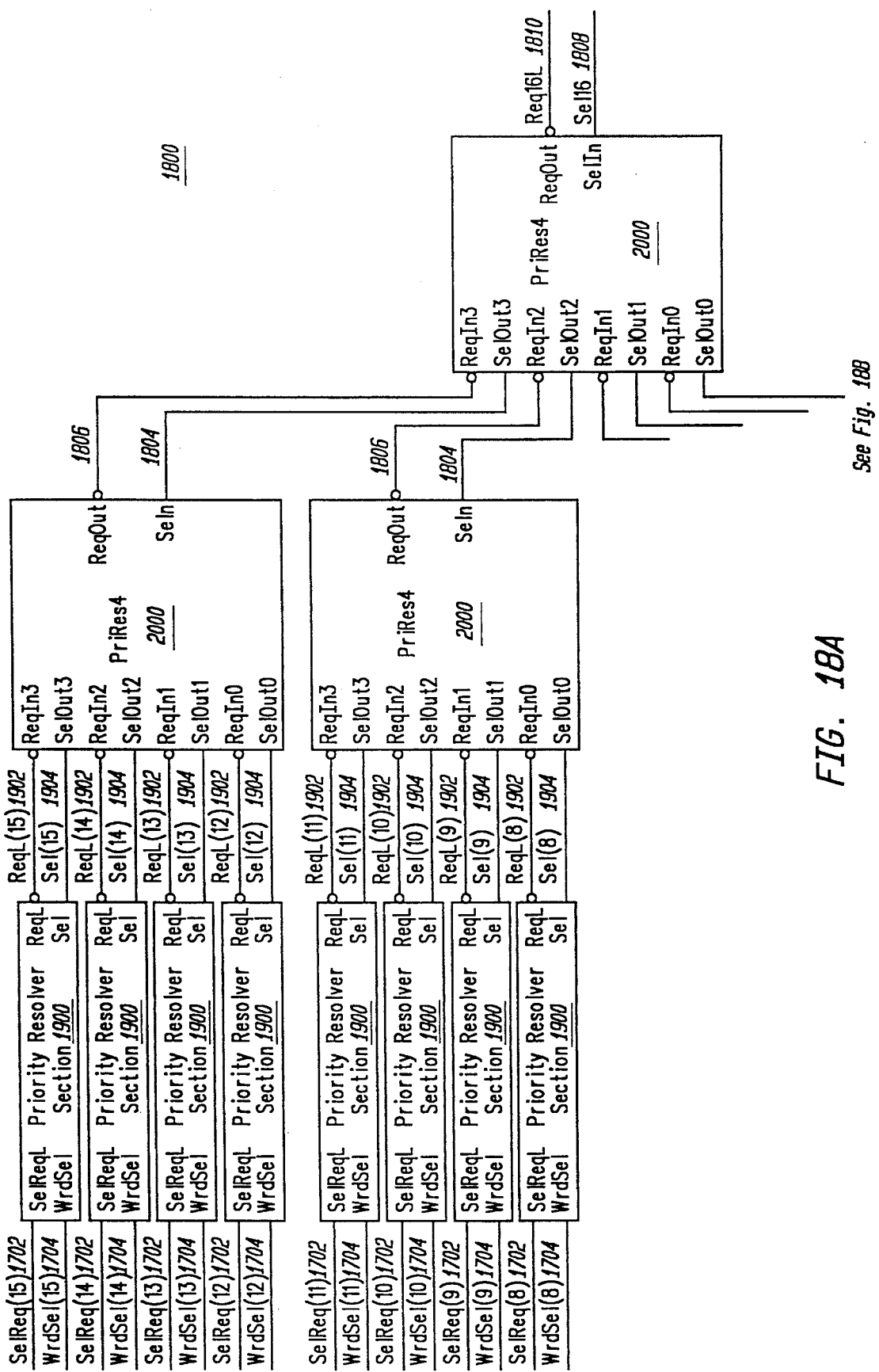
Figure 18B:
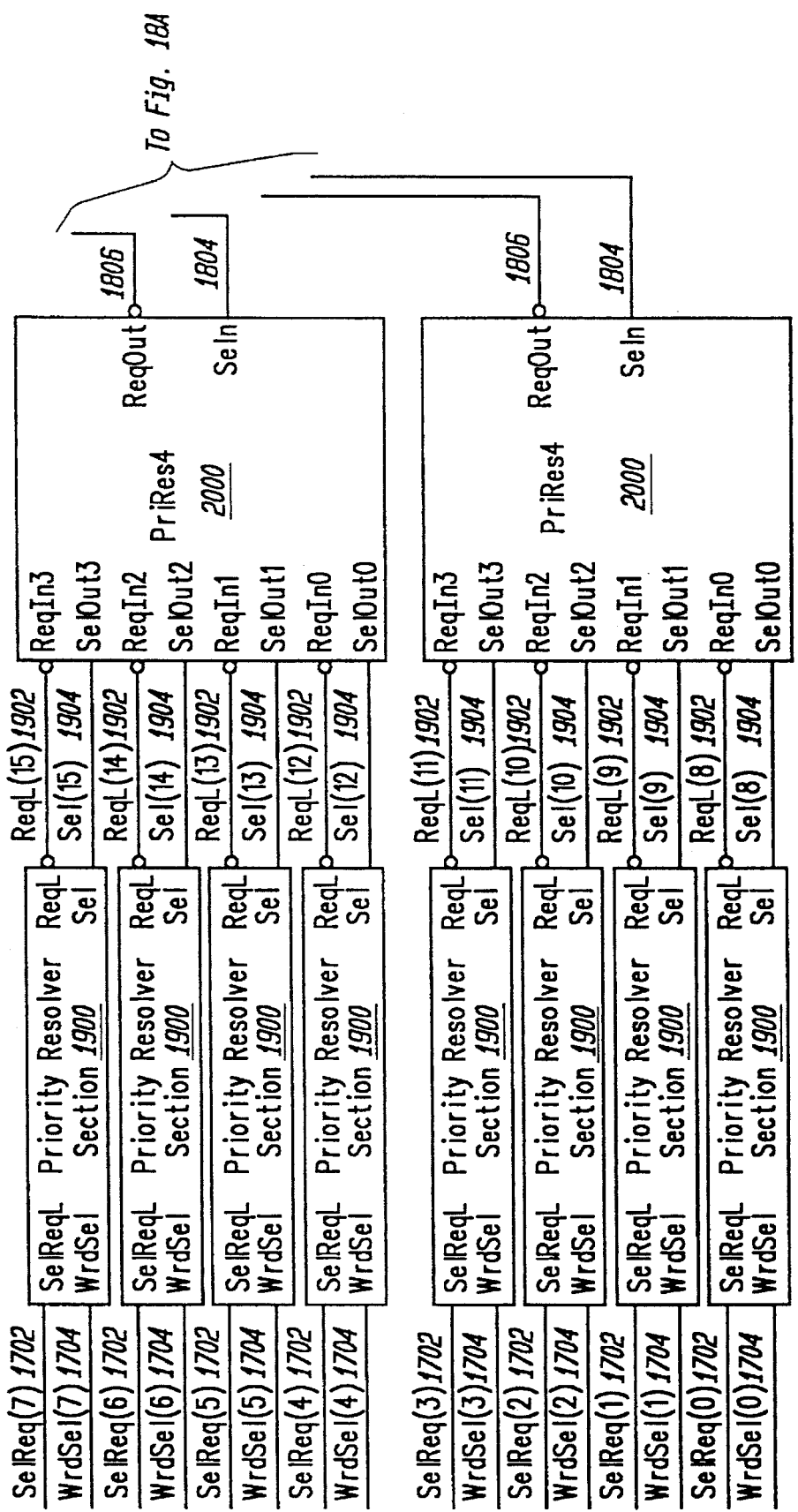

As described above, the GCAM 1000 uses the Priority Resolver 1800 to find the first GCAM Word 1100 with a hit or invalid data. However, if the Priority Resolve Bit 1700 circuit is used, the daisy chain enable could need to ripple through every GCAM Word 1100, thus becoming the critical path and limiting the clock frequency of the GCAM 1000 circuit. An alternative is a tree structure rather than a daisy chain. The tree structure for a sixteen word 1100 Priority Resolver 1800 is shown in FIG. 18.

Figure 19:
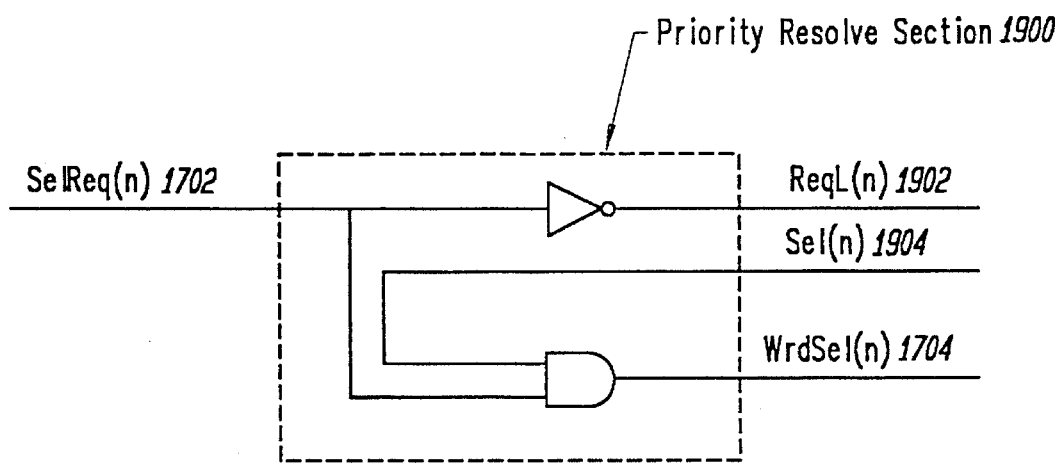
Figure 20:
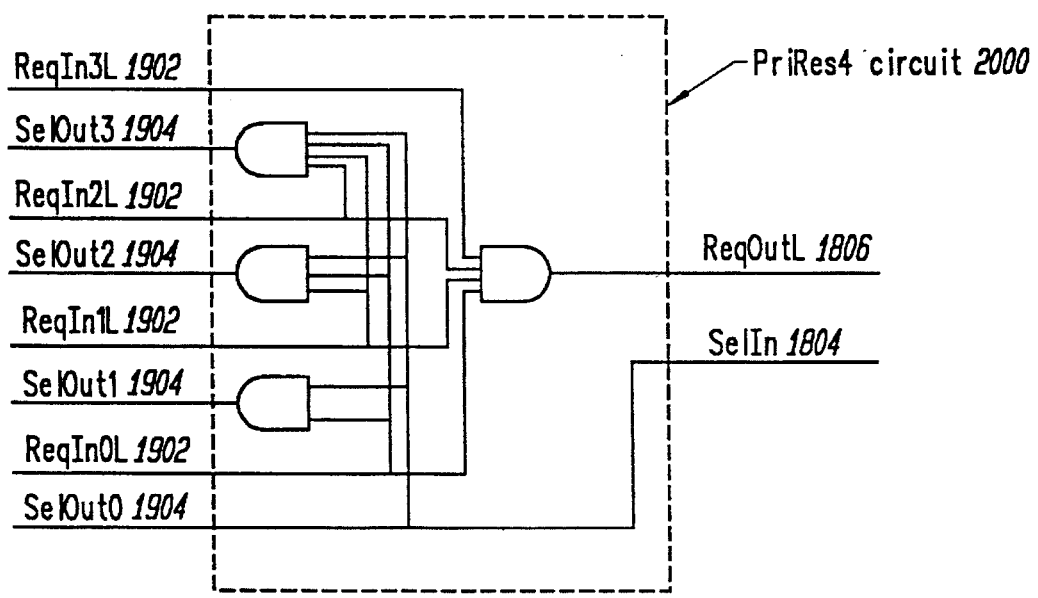

For each GCAM Word 1100, the main input and output are still SelReq(n) 1702 and WrdSel(n) 1704, just as for the Priority Resolve Bit 1700 circuit. There is one Priority Resolve Section 1900 for each GCAM Word 1100, and its circuit is shown in FIG. 19. The tree structure is build of PriRes4 2000 circuits, illustrated in FIG. 20. Each PriRes4 2000 resolves four request 1902 inputs, and outputs four select 1904 grants. None of four select 1904 grants are asserted unless SelIn 1904 for the PriRes4 2000 is asserted. If any of the four request 1902 inputs are active (shown active low), then ReqOut 1906 is asserted (low), which disabled all lower priority GCAM Words 1100. If only sixteen word 1100 are used, Sel16 1808 is permanently asserted, and Req16L 1810 is not used. For sixteen GCAM Words 1100, five PriRes4 2000 circuits are needed. For sixty-four GCAM Words 1100, twenty-one PriRes4 2000 circuits are needed.

CMOS Circuits for the GCAM 1000

The GCAM 1000 is very well suited to implementation in Very Large Scale Integration (VLSI) circuits, with CMOS being the current best choice. For layout of a VLSI circuit, the transistor circuits within GCAM Words 1100 must physically tile together to form a compact, regular pattern; much like that of typical RAM VLSI circuits. The memory circuits presented here make use of prior art support circuits such as differential sense amps and six transistor static RAM circuits.

Prior Art MCCAM Bit Cell 2100

Figure 21:
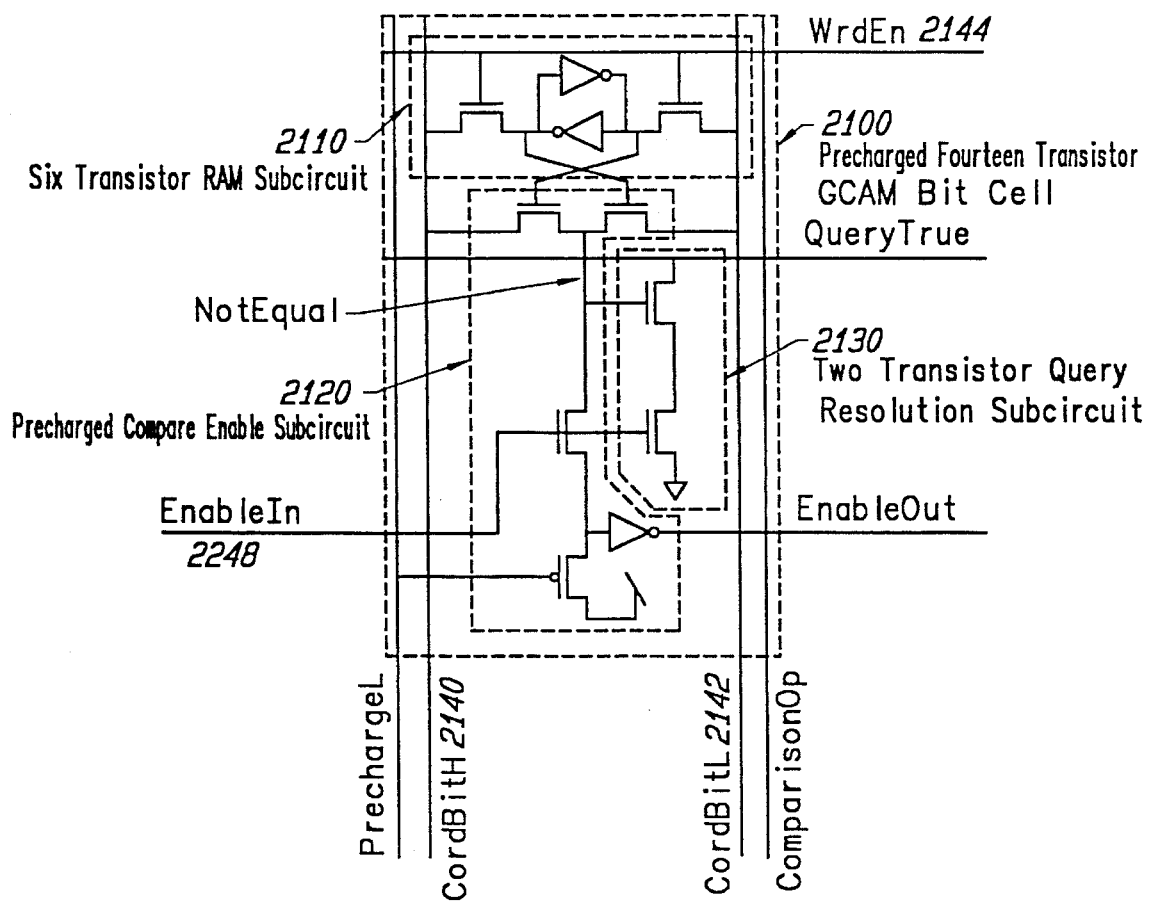

FIG. 21 is a CMOS circuit for the Precharged Fourteen Transistor GCAM Bit Cell 2100, which stores and compares one bit within a Coordinate Field 1200. This circuit is prior art, and is included in the Duluk Patent. The circuit 2100 includes a Six Transistor RAM Subcircuit 2110 for storing the bit value, a Precharged Compare Enable Subcircuit 2120, and a Two Transistor Query Resolution Subcircuit 2130. The cell 2100 has a differential data bus 2140 2142, similar to that used in six transistor static RAM circuits. The signal, WrdEn 2144, is asserted when either a read or a write operation is performed.

GCAM Bit Cell 2200

Figure 22:
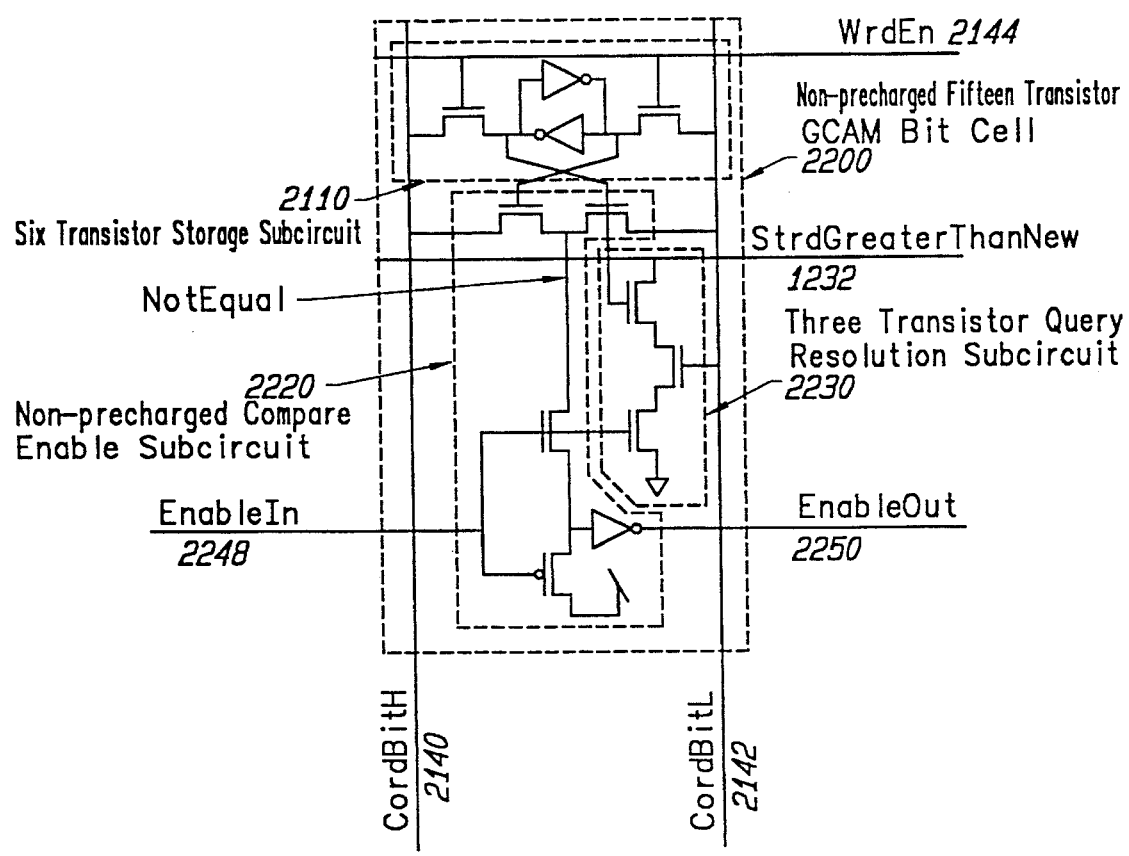

FIG. 22 is a CMOS circuit for the Non-precharged Fifteen Transistor GCAM Bit Cell 2200, which stores and compares one bit within a Coordinate Field 1200. The circuit 2200 includes a Six Transistor RAM Subcircuit 2110 for storing the bit value, a Non-precharged Compare Enable Subcircuit 2220, and a Three Transistor Query Resolution Subcircuit 2230. This cell 2200 adds one transistor (compared to the previous cell), but has reduced the number of vertical wires by two. The signal, StrdGreaterThanNew 1232, is precharged, and is pulled down by the Three Transistor Query Resolution Subcircuit 2230 when EnableIn 2246 is asserted, and the stored bit value is "0" and the input value is "1".

CMOS circuit for Coordinate Field 1200

Figure 23:
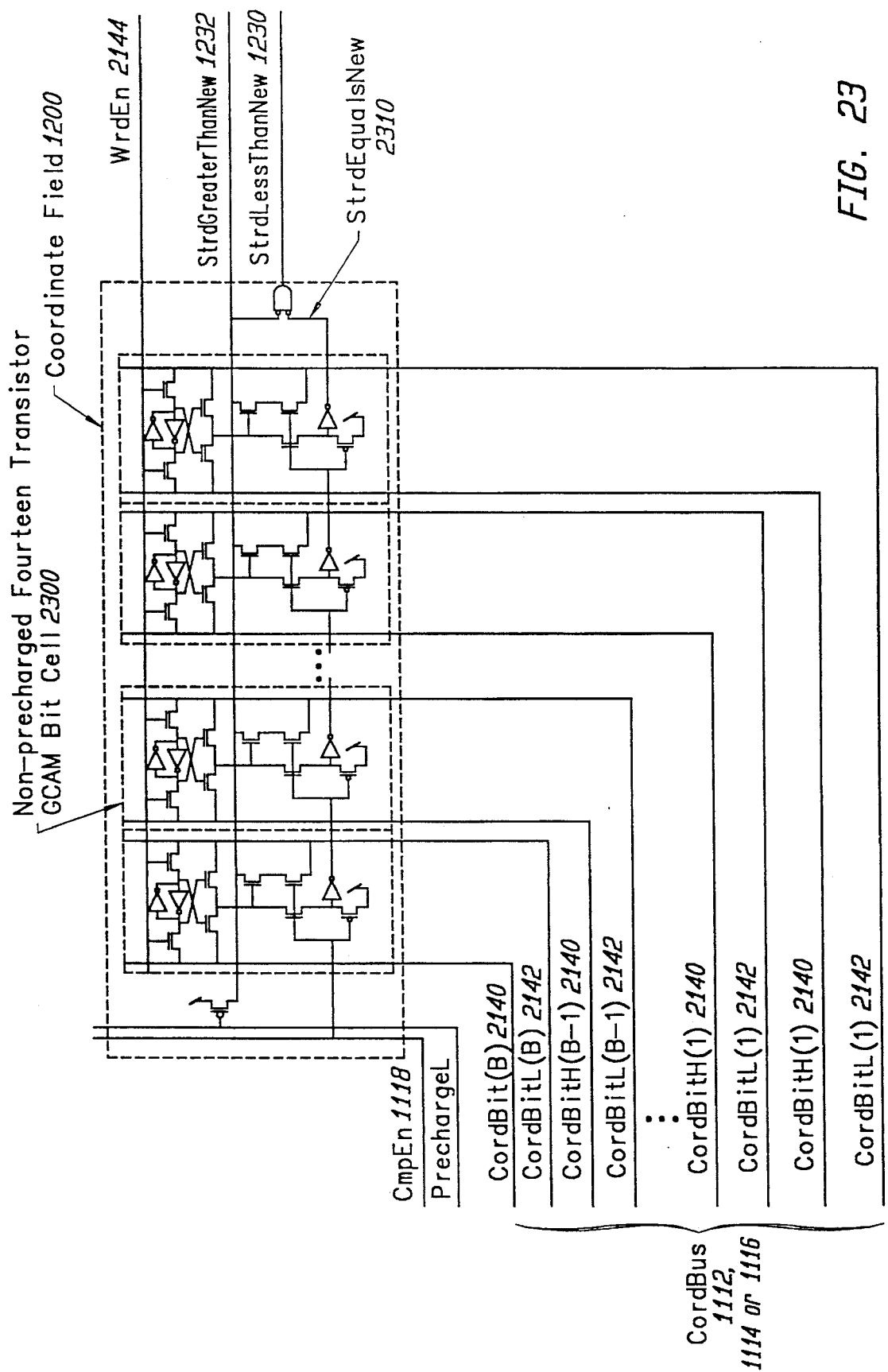

FIG. 23 is a CMOS circuit for the Coordinate Field 1200 composed of a multiplicity of Non-precharged Fourteen Transistor GCAM Bit Cells 2300. The EnableOut 2250 of the least significant cell (the rightmost in the figure) is the signal StrdEqualsNew 2310, which indicates the stored coordinate value equals the new coordinate value input on the CordBus 1112, 1114, or 1116.

Expansion to Four Dimensions

In addition to the three spatial dimensions of x, y, and z, a fourth dimension can be added: time. The time coordinate for a vertex would be stored in a fourth Coordinate Field 1200, and all the concepts previously discussed herein are expanded to four dimensions. Adding time as a fourth dimension allows the simulation time steps for objects to be independent. For example, an object could follow a piecewise linear trajectory through space, where each linear piece would correspond to a four-dimensional bounding box. Then, as the set of bounding boxes for all objects is processed, detected object collisions would be bounded by a time interval within the simulation.

Other Spatial Primitives

Bounding boxes, polygons, and polygon meshes have been the focus of this document. However, other spatial primitives can also be used. The GCAM 1000 can be easily modified to form a bounding box around any convex hull around a constellation of points (or vertices) in space. Hence, any spatial primitive hat can be bounded by a set of points in space can be used in the GCAM 1000.

One specific choice is a mesh of tetrahedrons. Tetrahedrons are polyhedrons with four vertices, and they can be formed into a mesh similar to triangles in a triangle mesh. That is, when a new vertex is added, three old vertices are reused, and a new tetrahedron is formed. As far as the GCAM 1000 is concerned, tetrahedrons are "polygons" with four vertices. Tetrahedrons have an advantage in that they describe the volume of an object, whereas polygons only describe the surface.

I claim as follows:

1. A geometric content addressable memory (GCAM) for determining the occurrence of collisions between displayed representations of a stored three-dimensional object and a new three-dimensional object, said representation of said stored object being defined by n stored vertices, said GCAM comprising:

(a) a plurality of bus lines including an x bus, y bus, and z bus, wherein said x, y and z busses respectively supply a new x, y and z coordinate of a new vertex of said new object to every one of said identical memory cells simultaneously;

(b) n identical memory cells, wherein an $n^{th}$ one of said memory cells includes:

(i.) coordinate storage and arithmetic comparator fields $X(n)$, $Y(n)$ and $Z(n)$ including register means for storing x, y and z coordinates of an $n^{th}$ one of said stored vertices, and arithmetic comparator means for simultaneously computing comparison results $XComp(n)$, $YComp(n)$ and $ZComp(n)$ indicating whether said new x, y and z coordinate supplied respectively from said x, y and z bus is less than or greater than said x, y and z coordinates stored in said register means of said coordinate fields $X(n)$, $Y(n)$ and $Z(n)$;

(ii.) a plurality of input lines carrying input signals including x-, y-, and z-coordinate vertex miss outputs $XVrtxMsOut(n-1)$, $YVrtxMsOut(n-1)$ and $ZVrtxMsOut(n-1)$ from an $n-1^{th}$ one of said memory cells;

(iii.) coordinate miss detectors $XMsDetect(n)$, $YMsDetect(n)$ and $ZMsDetect(n)$ that respectively compute vertex miss outputs $XVrtxMsOut(n)$, $YVrtxMsOut(n)$, $ZVrtxMsOut(n)$ and polynomial miss signals $XPlyMs(n)$, $YPlyMs(n)$, $ZPlyMs(n)$ based on said comparison results $XComp(n)$, $YComp(n)$ and $ZComp(n)$, a new status signal, and said vertex miss outputs $XVrtxMsOut(n-1)$, $YVrtxMsOut(n-1)$ and $ZVrtxMsOut(n-1)$ from a $n-1^{th}$ one of said memory cells, wherein a representative with x vertex miss output $XVrtxMsOut(i)$ indicates whether a said new x coordinate misses (or is not in collision with) corresponding stored x coordinates of vertices 1 through i of said stored object, and a said polynomial miss signal is identical to a said vertex miss output;

(iv.) a polygon miss detector that determines, based on said polynomial miss signals $XPlyMs(n)$, $YPlyMs(n)$, $ZPlyMs(n)$, said new status signal and a standard status signal whether said new vertex misses a polygon defined by said n vertices of said stored object; and (v.) control means for synchronizing operations of said $n^{th}$ cell with operations of said $n-1^{th}$ cell and a simulator display accelerator of which said GCAM is a part.

2. A geometric content addressable memory and collision detection apparatus, said apparatus comprising:

(a) means for storing a plurality of data words, each of said data words including a plurality of data fields including data fields for storing a single coordinate vertex values and a data field for storing a spatial primitive identifier defined by one or more of said words, each of said data fields being divided into a plurality of data bits;

(b) a data bus for providing an input data stream including a plurality of input field matching some of said data word fields including input fields containing coordinate vertex values, and each said input field divided into input bits so as to have a one-to-one bit correspondence to the said data bits in said matching data fields in said words;

(c) query means for simultaneously comparing said plurality of input fields provided by said input data bus to all said stored data words, with simultaneous field comparisons such that each said data word field matching said input field is compared to its corresponding input field, and for generation of query results for at least one said field in said data word and for temporarily storing within said data word; and (d) collision miss detector means for receiving said query results from a multiplicity of said data word, and for generating a spatial primitive miss signal indicating that the spatial primitive associated with said data word does not intersect with the spatial primitive associated with said input field.

3. A system for querying geometrical data to determine object collisions in three-dimensional space, comprising:

means for receiving a new multi-dimensional coordinate vertex representing a location on a portion of a multi-dimensional object, a predetermined plurality of said vertices received in a predefined order defining an spatial primitive;

means for relating said newly received coordinate vertex with previously received vertices to form vertex associations that define said spatial primitives;

means for simultaneously storing said received vertex and comparing a spatial primitive completed by said received vertex and said associated vertices with all other previously received and stored spatial primitives defined by earlier received vertices to determine if said newly formed spatial primitive has an multi-dimensional coordinate extent that collides (overlaps) with the multi-dimensional coordinate extent of any previously defined and stored spatial primitives;

means for storing an indication of said collision in association with said stored vertex.

4. A method for storing and querying geometrical data to determine geometrical object collisions in three-dimensional space, said method comprising the steps of:

(a) receiving a description of a multiplicity of geometry items as ordered sets of values having a predetermined number of vertex coordinates, said set of vertex coordinates including an x-coordinate, a y-coordinate, and a z-coordinate, at least some of said sets of vertex coordinates being shared between a plurality of said multiplicity of geometrical items;

(b) storing each said received vertex coordinate as it is received in the order received in at most one vertex storage location, each said shared vertex coordinate being stored only once;

(c) establishing a vertex link indicator to each one of said vertices that jointly form a surface with a linking indicator stored with said vertex coordinate identifying the geometry item associated with the vertex stored in the word;

(d) simultaneously comparing the x-, y-, z-coordinate extent of a received geometry item with the respective x-, y-, z-coordinate extents of all earlier received and stored geometry items to determine if said received and stored objects intersect, said simultaneous comparing including comparisons based on a predetermined number of previous collision comparisons;

(e) storing coordinate extent collision information from a predetermined number of said simultaneous comparisons;

(f) using said vertex link indicator in said step of simultaneously comparing to control propagation of coordinate extent collision information from a predetermined number of previous comparisons; and (g) repeating said steps (a)–(f) for each geometry item received.

5. The apparatus in claim 4, further comprising means for groups of GCAM words to operate cooperatively to store a spatial geometry primitive without vertex storage redundancy; and means for said spatial geometry primitive to share vertices.

6. A geometrical content addressable memory (GCAM) word structure comprising:

coordinate field storage and logic means for receiving a new coordinate value from a coordinate bus, for storing said new value as a stored value in response to write control signals, for reading said stored value in response to read control signals, and for arithmetically comparing a later arriving new value with said stored value to generate a signal indicating whether said stored value is less than or greater than said later arriving new value;

coordinate tag field storage and logic means for storing the address identifier for the geometry item stored in the particular GCAM word;

coordinate collision miss detector means for receiving a plurality of coordinate query comparison results from comparisons of the coordinate extents of said new polygon with said stored polygons and for generating a coordinate miss signal indicating that the stored polygon is either wholly greater than or wholly less than the extent;

polygon collision miss detector means for receiving a plurality of coordinate miss-detect signals, and for simultaneously comparing said coordinate miss-detect signals to determine if any one of said plurality of coordinate miss-detect signals indicate that the coordinate extent of said stored polygon does not overlap the coordinate extent of said new polygon;

word status flag storage and logic means associated with each said GCAM word for receiving a first plurality of word status control signals, for storing said signals, and for generating a second plurality of word status indicators that define the treatment afforded to the stored coordinate vertex associated with said word status indicators;

word control logic means associated with each GCAM word for controlling the reading and writing of data to and from said word in response to word status indicators, word operation control signals, and word identifier selection signals from said priority resolver means; and word priority resolver means for identifying the first GCAM word address storing either a collision hit or invalid data indicator.

7. A coordinate field storage and logic structure comprising:

a multiple-bit register for receiving a new coordinate value from a coordinate bus and for storing said received coordinate value as a stored coordinate in response to a clock signal and a word write enable control signal;

read means for reading said stored coordinate value from said register and for outputting said stored coordinate value to said coordinate bus as a new coordinate in response to a word read enable control signal;

first arithmetic comparator means for receiving said stored coordinate value from said register and said new coordinate value from said coordinate bus, and for comparing said stored and new values in response to a compare enable control signal and generating a first stored-less-than-new coordinate query result signal when said stored value is less than said new value; and second arithmetic comparator means for receiving said stored coordinate value from said register and said new coordinate value from said coordinate bus, and for comparing said stored and new values in response to a compare enable control signal and generating a second stored-greater-than-new coordinate query result signal when said stored value is greater than said new value;

said first and second arithmetic comparator means making said comparisons and generating said first and second coordinate query result signals simultaneously with receipt of said new coordinate value from said coordinate bus.

8. A coordinate collision miss detector structure comprising:

means for receiving a new ($m^{th}$) coordinate query comparison result signal;

means for storing a middle ($m-1^{th}$) coordinate query comparison result signal, said middle coordinate query comparison result signal corresponding to the new coordinate query comparison result signal from the previous clock cycle;

means for storing an oldest ($m-2^{th}$) coordinate query comparison result signal, said oldest coordinate query comparison result signal corresponding to the middle coordinate query comparison result signal from the previous clock cycle;

first means for generating a comparison conjunction result for a coordinate by logically ANDing together a plurality of signals derived from said coordinate query comparison result signals and generating a coordinate miss due-to-less-than signal when the extent of the stored polygon is determined by said comparison to be wholly less than the extent of the new polygon;

second means for generating a comparison conjunction result for a coordinate by logically ANDing together a plurality of signals derived from said coordinate query comparison result signals and generating a coordinate miss due-to-greater-than signal when the extent of the stored polygon is determined by said comparison to be wholly greater than the extent of the new polygon; and means for generating a coordinate polygon miss signal indicating that said stored polygon does not overlap in said coordinate extent with said new polygon when either of said coordinate miss due-to-less-than signal or said coordinate miss due-to-greater-than signal are asserted.

9. The coordinate collision miss detector structure in claim 8, wherein said plurality of signals derived from said coordinate query comparison result signals include the new, middle, and oldest signals derived from said coordinate query comparison result.

10. A polygon collision miss detector structure comprising:

means for receiving from said plurality of coordinate miss-detect means a plurality of coordinate polygon miss detect signals; and means simultaneously computing the disjunctive logical OR of said plurality of coordinate polygon miss detect signals and generating a polygon box mis-detect signal when any one of said plurality of coordinate miss-detect signals indicate that the coordinate extent of said stored polygon does not overlap the coordinate extent of said new polygon.

11. The polygon collision miss detector of claim 10, further comprising:

means for receiving a stored polygon is invalid signal to indicate that the coordinate vertex stored in the particular word does not correspond to a valid polygon;

means for receiving a new polygon is invalid signal to indicate that the new coordinate vertex received does not correspond to a valid polygon; and wherein said means for simultaneously computing the disjunctive logical OR further computes the disjunctive logical OR of said new polygon invalid signal and said stored polygon is invalid signal.

12. A word status flag storage and logic structure comprising:

first register means for storing an invalid data status indicator which when asserted indicates that the data stored in the word is invalid and can be overwritten;

second register means for storing a considered stored indicator which when asserted indicates that the vertex stored in the word correspond to a valid stored polygon;

third register means for storing a vertex completes polygon indicator which when asserted indicates that the vertex stored in the word completes a valid polygon;

logic means for generating a stored polygon invalid indicator which when asserted indicates that the vertex stored in the word does not correspond to a valid polygon when either said considered stored indicator and said vertex completes polygon are asserted;

fourth register means for storing a replace oldest vertex indicator which when asserted indicates that the vertex stored in the word has replaced the oldest vertex of the previous polygon;

fifth register means for storing a disable oldest polygon indicator which when asserted indicates that the polygon completed by the coordinate stored in the word does not use the oldest vertex of the previous polygon; and logic means for setting and resetting said register means in response to predetermined status control signals.

13. A word control logic structure comprising:

register means for storing a value derived from said polygon box miss signal output from said polygon miss-detect means of a particular word in response to a store hits/misses control signal generated during a clock cycle when a spatial query is performed, a value being stored in each said GCAM word simultaneously;

means responsive to said priority resolver means for selecting a single word for writing to and enabling writing of data to predetermined fields (coordinate and tag) of said selected word; and means responsive to said priority resolver means and a vertex read select control signal for selecting a single word for reading from and enabling reading of data from predetermined fields of said selected single word.

14. A word address priority resolver structure comprising:

means for receiving a word select request signal; and means for generating a priority out signal wherein if said word select signal for said particular word is not asserted then said priority out signal is a daisy chain output of the priority out signal from the previous GCAM word, and if said word select signal for said particular word is asserted and said priority out signal for said previous GCAM word is asserted then asserting a word select signal indicating that the particular word is selected for reading and writing.

15. The word address priority resolver structure in claim 14, wherein said priority resolver is configured as a hierarchical tree structure.

16. The priority resolver structure in claim 14, wherein said priority resolver structure includes precharged domino logic devices so that the output is efficiently indicating its own completion.

17. A tag field storage and logic structure comprising:

means for storing an address identifier for a geometry item stored in the particular GCAM word; and logic means for queuing the contents of said stored address identifier.

18. The tag field storage and logic structure in claim 17, wherein for a polygon type geometry item, said address identifier is for identifying the address of the polygon completed by the vertex stored in the particular GCAM word.

19. A geometrical content addressable memory (GCAM) logic circuit comprising:

a plurality of word logic means for storing vertex coordinate values related to a geometry item and for computing geometry item coordinate collision results;

control means for controlling movement of data values into said word logic means and for controlling output of object collision result data from said GCAM; and means for receiving x-, y-, and z-coordinate values for each geometry item from an external coordinate source;

each said word logic means including:

x-coordinate field storage and comparison logic means including register means for storing an x-coordinate and arithmetic comparison means for arithmetically comparing a new x-coordinate value present on an x-coordinate bus with said x-coordinate value stored in said register means and to determine if said stored value is greater-than or less-than said bus x-coordinate, and for generating an x-coordinate comparison result based on said comparison;

y-coordinate field storage and comparison logic means including register means for storing a y-coordinate and arithmetic comparison means for arithmetically comparing a new y-coordinate value present on a y-coordinate bus with said y-coordinate value stored in said register means and to determine if said stored value is greater-than or less-than said bus y-coordinate, and for generating a y-coordinate comparison result based on said comparison;

z-coordinate field storage and comparison logic means including register means for storing a z-coordinate and arithmetic comparison means for arithmetically comparing a new z-coordinate value present on a z-coordinate bus with said z-coordinate value stored in said register means and to determine if said stored value is greater-than or less-than said bus z-coordinate, and for generating a z-coordinate comparison result based on said comparison;

an x-coordinate collision miss detect field logic means associated with said x-coordinate field storage and comparison logic means for receiving said x-coordinate comparison result, a word status flag, and a status control signal and determining whether the x-extent of the stored polygon is wholly less-than the x-extent of the new polygon or wholly greater-than the x-extent of the new polygon, and generating an x-coordinate vertex miss output signal(n) indicating that said x-extent of said stored polygon is wholly greater-than or less-than the x-extent of said new polygon;

a y-coordinate collision miss detect field logic means associated with said y-coordinate field storage and comparison logic means for receiving said y-coordinate comparison result, a word status flag, and a status control signal and determining whether the y-extent of the stored polygon is wholly less-than the y-extent of the new polygon or wholly greater-than the y-extent of the new polygon, and generating an y-coordinate vertex miss output signal(n) indicating that said y-extent of said stored polygon is wholly greater-than or less-than the y-extent of said new polygon;

a z-coordinate collision miss detect field logic means associated with said z-coordinate field storage and comparison logic means for receiving said z-coordinate comparison result, a word status flag, and a status control signal and determining whether the z-extent of the stored polygon is wholly less-than the z-extent of the new polygon or wholly greater-than the z-extent of the new polygon, and generating an z-coordinate vertex miss output signal(n) indicating that said z-extent of said stored polygon is wholly greater-than or less-than the z-extent of said new polygon;

a polygon collision miss detect field logic means for receiving said x-coordinate vertex miss output signal(n), said y-coordinate vertex miss output signal(n), and said z-coordinate vertex miss output signal(n) and generating a polygon box miss detect signal when any of said x-, y-, or z-coordinate vertex miss output signals indicates that said coordinate vertex misses;

word status flag field storage and logic means for storing word status indicators and for controlling use of said word based on said status indicators, including controlling use of said word as a stored or as a new vertex;

word control field logic means for controlling reading and writing of said word; and word priority resolver means for identifying the first GCAM word address storing either a collision hit or invalid data indicator.

20. A method for detecting spatial volume collisions in a graphics simulator between multi-dimensional objects, each said object represented as at least one mesh of interconnected object primitives, each said object primitive defined by a plurality of vertex data, and each said vertex data including an object identifier, a vertex identifier, and a vertex coordinate, each vertex that is shared by multiple object primitives being represented only a single time in said object representation, the vertex coordinates of all vertices making up said object primitive defining a coordinate extent of said object primitive and the vertex coordinates of all said object primitives making up said object defining the coordinate extent of said object, said method comprising:

receiving an input data item for an object primitive from an external object data source;

simultaneously comparing, as each said object primitive is received, the coordinate extent of said newly received object primitive with the coordinate extent of all other of said previously received and stored object primitives to determine intersections (collisions) between said newly received object primitive and said previously stored object primitives, said comparing being performed on a coordinate axis by coordinate axis basis;

labeling each said determined object primitive intersection but selectively ignoring intersections between object primitives belonging to the same object based on predetermined rules; and identifying each object having an intersection with another object based on said intersecting object primitives.

21. The method in claim 20, wherein said multi-dimensional coordinate comprises an x-coordinate, a y-coordinate, and a z-coordinate.

22. The method in claim 21, wherein said multi-dimensional coordinate further comprises a time coordinate (t-coordinate).

23. The method in claim 21, wherein said predetermined rules include ignoring intersections of object primitives within a fixed portion of said object, but not ignoring intersections of object primitives for the same object when said object includes object components that may change location relative to other same object components.

24. A method of detecting collisions between a plurality of three dimensional objects, comprising the steps of:

(A) representing each said three-dimensional object as one or more mesh, each said mesh including one or more spatial primitives, each said spatial primitive being represented by a plurality of connected spatial vertices, at least one of said spatial primitives having a unique vertex not shared by any other one of said spatial primitives within the same mesh, and at least one of said spatial primitives within said same mesh having a common vertex that is at the same spatial location as a vertex of at least one other different spatial primitive within said same mesh;

(B) for each mesh in a selected object:

(1) identifying unique vertices and common vertices within said selected mesh, wherein said unique vertices are vertices not included in more than one spatial primitive within said selected mesh, and wherein said common vertices are vertices included in at least two spatial primitive within said selected mesh;

(2) receiving each vertex sequentially from an external spatial primitive source and performing the following steps:

(a) storing each received reflex, including each common vertex, only once in a memory as said vertex is received, and storing indicators associated with each said stored vertex in said memory that identify all of the spatial primitives to which said stored vertex is relevant;

(b) generating at least one vertex comparison result by comparing coordinate values of each said received vertex with the corresponding coordinate values of all other previously stored vertices belonging to other than said same object as said received vertex, if any, to indicate on a coordinate axis-by-axis basis either that said received vertex coordinate values are greater-than, less-than, or equal-to, the corresponding coordinate values of all of said previously stored vertices, and temporarily storing said at least one vertex comparison result in said memory; and (c) determining if said received vertex completes formation of a spatial primitive, and if said determination indicates that said received vertex completes formation of a spatial primitive, then examining each said temporarily stored vertex comparison result generated for a vertex belonging to said completed spatial primitive to generate an overlap result indicating whether any coordinate for said completed spatial primitive is wholly greater-than or wholly less-than the corresponding coordinates of all previously stored spatial primitives such that no overlap exists, or that any coordinate for said completed spatial primitive is not wholly greater-than and not wholly less-than the corresponding coordinates of all previously stored spatial primitives such that overlap exits; and (C) repeating step (B) for another selected object.

25. The method in claim 24, wherein said spatial primitives are selected from the group consisting of bounding box, parallelepiped bounding volume, objects represented by a constellation of vertices, points, lines, triangles, polygons, polyhedra, polygon meshes, polyhedron meshes, CSG primitives, and combinations thereof.

26. The method of claim 24, wherein said step of generating at least one vertex comparison result is performed in parallel for each said received vertex.

27. The method of claim 24, wherein an entire three-dimensional object is approximated by a single spatial primitive, and wherein said spatial primitive is a multiplicity of spatial vertices and the convex hull around said vertices encloses said entire object.

28. The method of claim 24, wherein said steps of (a) storing, (b) generating, and (c) determining are performed simultaneously.

29. The method of claim 24, wherein said steps of (a) storing, (b) generating, and (c) determining are performed in parallel.

* * * * *